US 6,529,254 B1

(12) United States Patent
Suganuma

(10) Patent No.: US 6,529,254 B1
(45) Date of Patent: Mar. 4, 2003

(54) OPTICAL ELEMENT AND METHOD FOR MANUFACTURING THE SAME, AND OPTICAL APPARATUS AND METHOD FOR MANUFACTURING THE SAME

(75) Inventor: Hiroshi Suganuma, Ibaraki (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/416,260

(22) Filed: Oct. 12, 1999

(30) Foreign Application Priority Data

Oct. 13, 1998 (JP) ............................................. 10-291181

(51) Int. Cl.⁷ .............................................. G02F 1/1335
(52) U.S. Cl. .............................. 349/104; 349/1; 349/17; 250/201.9
(58) Field of Search ................................ 349/104, 124, 349/17, 1; 359/75, 76; 250/201.9

(56) References Cited

U.S. PATENT DOCUMENTS

| 4,943,709 A | * | 7/1990 | Grinberg et al. ......... 250/201.9 |
| 5,479,282 A | * | 12/1995 | Toko et al. .................... 359/75 |
| 5,508,832 A | * | 4/1996 | Shimada ...................... 359/76 |
| 5,576,862 A | * | 11/1996 | Sugiyama et al. ............ 359/75 |
| 5,657,105 A | * | 8/1997 | McCartney .................. 349/157 |
| 5,684,545 A | * | 11/1997 | Dou et al. ...................... 349/1 |
| 5,789,734 A | * | 8/1998 | Torigoe et al. ........... 250/201.2 |
| 5,978,053 A | * | 11/1999 | Giles et al. ..................... 349/17 |
| 6,107,617 A | * | 8/2000 | Love et al. ............... 250/201.9 |

FOREIGN PATENT DOCUMENTS

EP  0 763 422 A1  3/1997

* cited by examiner

*Primary Examiner*—Kenneth Parker
*Assistant Examiner*—David Chung
(74) *Attorney, Agent, or Firm*—Sonnenschein, Nath & Rosenthal

(57) ABSTRACT

It is the object of the present invention to provide an optical element for controlling the polarization state spatially by using a liquid crystal and a method for manufacturing the same, and to provide an optical apparatus for correcting the polarization state in conformity with a particular purpose and method for manufacturing the same. The optical element for controlling the polarization state of light spatially by modifying directions of orientation of liquid crystal molecules caused by an oriented film and the optical apparatus by the use of the optical element are described. Orientation which is realized in the aforesaid oriented film for liquid crystal molecules is controlled by light irradiation with ultraviolet light etc. In irradiation, used is either of two methods: one method in which light irradiation is performed while the polarization state is being changed by using masks; the other method in which light irradiation is performed while the oriented film is being moved relative to the light irradiating means.

10 Claims, 24 Drawing Sheets

CONTOUR MAP OF
THE UPPER DIAGRAM

COUNTOUR MAP OF
THE UPPER DIAGRAM

F I G. 15
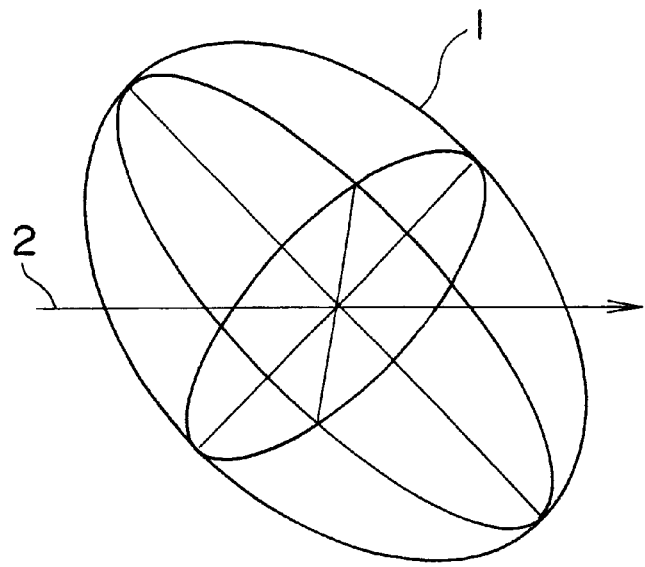
F I G. 16
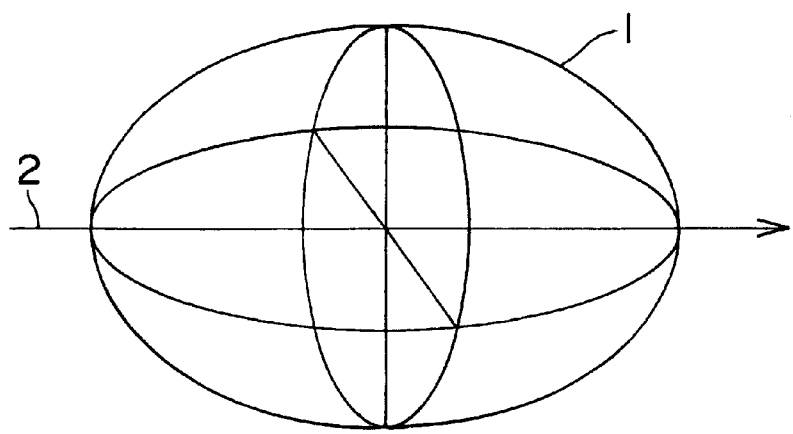

POLARIZED LIGHT AFTER PASSING THROUGH THE HALF-WAVELENGTH PLATE

POLARIZED LIGHT AFTER PASSING THROUGH THE LENS WITH ZERO REFRACTING POWER

INCIDENT LINEARLY POLARIZED LIGHT

DIRECTIONS OF POLARIZATION OF INCIDENT LIGHT

DIRECTION OF POLARIZATION OF OUTGOING LIGHT TRANSMITTED THROUGH THE OPTICAL SYSTEM TO BE CORRECTED

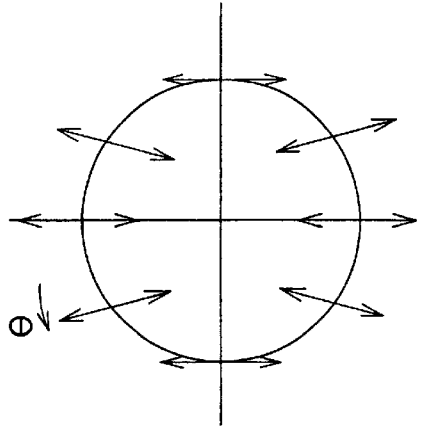

FIG. 21E DIRECTIONS OF ORIENTATION OF A CORRECTION OPTICAL SYSTEM

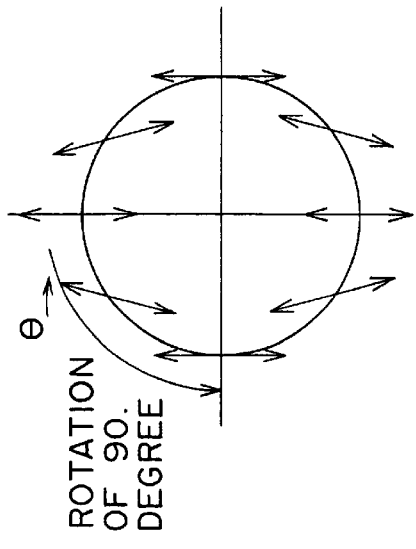

FIG. 21D DIRECTIONS OF POLARIZATION OF LIGHT GENERATED BY THE EXPOSURE OPTICAL SYSTEM FOR GENERATING A CORRECTION OPTICAL SYSTEM AFTER PASSING THROUGH THE HALF-WAVELENGTH PLATE

ROTATION OF 90. DEGREE

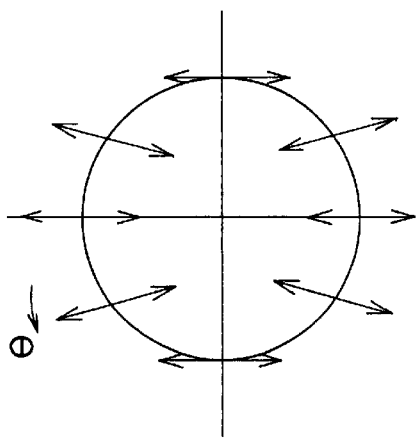

FIG. 21C DIRECTIONS OF POLARIZATION OF LIGHT GENERATED BY THE EXPOSURE OPTICAL SYSTEM FOR GENERATING A CORRECTION OPTICAL SYSTEM

DIRECTIONS OF
ORIENTATION OF
THE LIQUID CRYSTAL
ORIENTED FILM

THE AMPLITUDE OF AN X-DIRECTION
POLARIZED COMPONENT AFTER PASSING
THROUGH THE LIQUID CRYSTAL CELL

F I G. 24
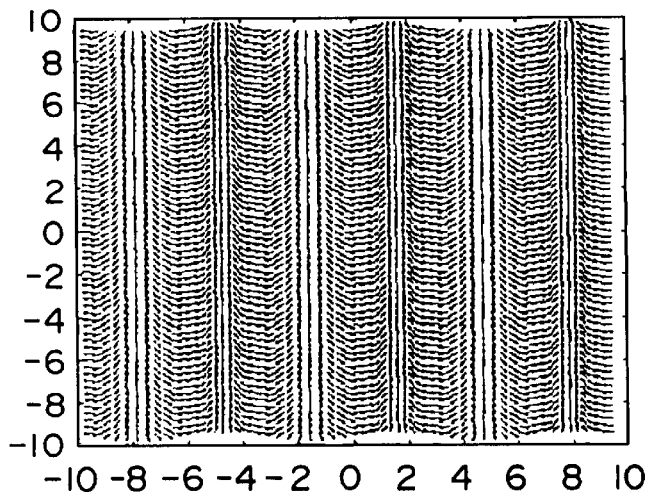
DISTRIBUTION OF DIRECTIONS OF POLARIZATION OF LIGHT TRANSMITTED THROUGH THE LIQUID CRYSTAL ORIENTED FILM
F I G. 25
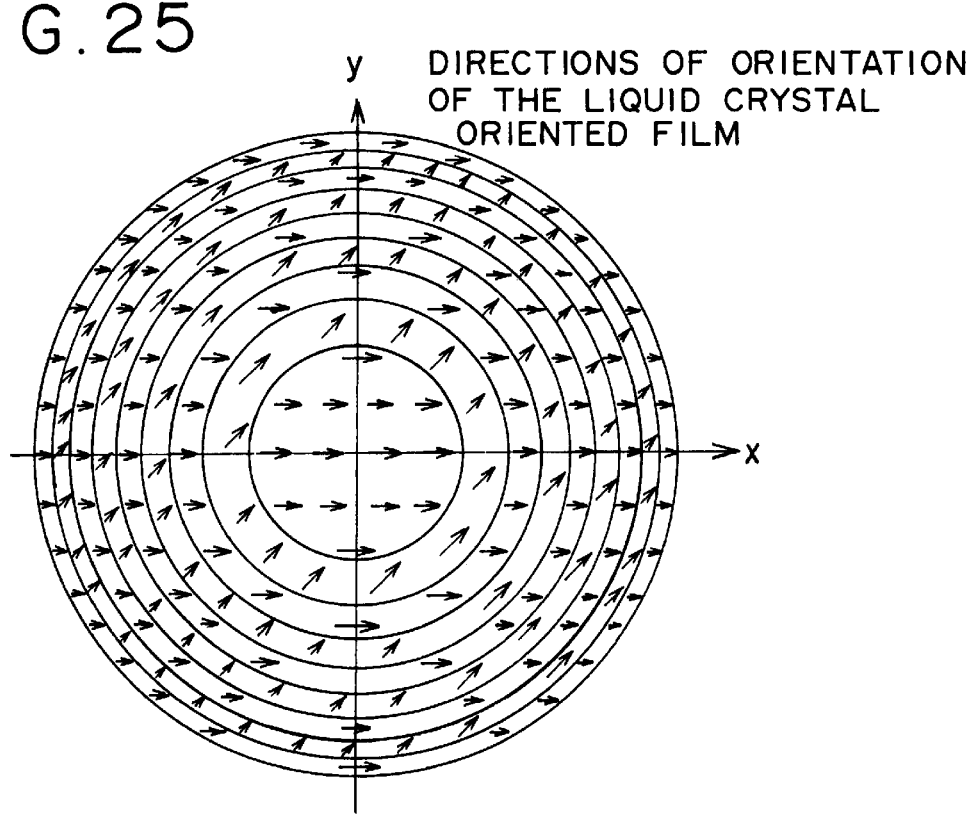
DIRECTIONS OF ORIENTATION OF THE LIQUID CRYSTAL ORIENTED FILM

X-AXIS DIRECTION COMPONENT OF LIGHT TRANSMITTED THROUGH THE LIQUID CRYSTAL CELL

WHITE
BACKGROUND     1

BLACKENED
AREA           0

DISTRIBUTION OF DIRECTIONS OF POLARIZATION OF LIGHT TRANSMITTED THROUGH THE LIQUID CRYSTAL CELL

WHITE          x-DIRECTION
BACK-          POLARIZED
GROUND         LIGHT

CROSS-         y-DIRECTION
HATCHED        POLARIZED
AREA           LIGHT

OPTICAL ELEMENT AND METHOD FOR MANUFACTURING THE SAME, AND OPTICAL APPARATUS AND METHOD FOR MANUFACTURING THE SAME

BACKGROUND OF THE INVENTION

1. Field of the Invention

The present invention relates to an optical element that uses a liquid crystal and a method for manufacturing the same and an optical apparatus and a method for manufacturing the same.

2. Description of the Related Art

Liquid crystal cells generally have a structure in which a liquid crystal is sandwiched between oriented films or between an oriented film and a transparent electrode and are capable of controlling phase of light or modulating it. The structure is, for example, such as is shown FIG. 11 through FIG. 13, that is, transparent electrodes 2 (ITO etc.) and oriented films 3 are provided on two sheets of glass substrates 1, the oriented films 3 are opposed with a constant spacing therebetween by the use of spacers 4, and a liquid crystal 5 is filled therein. Numeral 6 denotes a power supply.

When an external voltage is applied to this liquid cell, direction of orientation of liquid crystal molecules changes form a longitudinally arranged state shown in FIG. 11 (upward direction in the figure) to an obliquely arranged state shown in FIG. 12 (aslant upward direction in the figure). When the voltage is further increased, the liquid crystal finally reaches a transversely arranged state whose direction of arrangement is parallel to a direction of the applied voltage as shown in FIG. 13. If one controls the direction of orientation of liquid crystals in this way, direction of the index ellipsoid changes gradually from FIG. 14 to FIG. 16, which means that the refractive index which incident light senses varies, and therefore one can control phase of light or modulate it by using this variation of birefringence.

Normally, the oriented film consists of a polymer organic film provided on the substrate by spin coating and minute grooves are formed thereon in one direction by further rubbing the film with cloth. When no external voltage is applied on the liquid crystal cell, liquid crystal molecules are arranged along these grooves; when the external voltage is applied, the liquid crystal molecules are arranged to be gradually and continuously in parallel to a direction of the applied external voltage. However, since such a method of forming the oriented film involves a problem of light scattering, ununiformity, and inclusion of dusts, recently a method of forming the oriented film by means of exposure by ultraviolet light attracts public attention as its alternative method.

That is, this formation method, which is entirely different form the method in which grooves are formed physically as described above, aims to endow anisotropy to the oriented film (note: strictly speaking, any orientation film before being oriented should be called as an orientation film rather than an oriented film, but hereinafter term "oriented film" is used also for an orientation film for simplicity) by irradiating it with linearly polarized ultraviolet light, using photoisomerization reaction, photodimerization reaction, photodecomposition reaction, etc.

In most cases, macromolecules on the oriented film tends to arrange themselves in a direction normal to the direction of polarization of the ultraviolet light, and if the oriented film thus prepared is used, liquid crystals also arrange themselves in a direction normal to the direction of polarization of the ultraviolet light. Such a formation method has been developed to enlarge the angle of visibility in liquid displays as a main purpose (Published Unexamined Patent Applications No. Hei 10-90675 and No. Hei 10-123523) and is expected to find its applications in consumer electronic parts as well as liquid crystal displays.

On the other hand, magneto-optical apparatuses need separation of polarized lights in detecting signals, and a polarization hologram, in which a diffraction grating having polarization property was formed on $LiNbO_3$ using proton ion exchange, has been proposed before to devise such a function (Published Unexamined Patent Application No. Hei 6-300921). However the fabrication method, in practice, has drawbacks of complexity and high fabrication cost.

Moreover, methods to correct coma aberrations occurred when an optical disk is driven and spherical aberration occurred when an optical disk whose substrate is of different thickness is read has been proposed (Published Unexamined Patent Applications No. Hei 10-20263 and No. Hei 10-92004) employing a liquid crystal element whose liquid crystal cell is divided into sections, each of which is provided with electrodes. However, weak points of this method are that wiring of transparent electrodes as well as a driving method are rather complex and that shielding of transmitted light and limited workability of electrodes due to electrode structure itself give rise to low efficiency and low accuracy of correction of wave front.

As for manufactures of holograms, a lot of methods are known besides the aforesaid methods. For example there is a method in which phase distribution for forming a desired diffraction pattern is calculated and then a hologram is manufactured based on the phase distribution. However, such methods as represented by the aforesaid method have common a problem, that is, most of elements used therein are static elements, and therefore it is difficult to manufacture a high-precision element having a dynamic function.

On the other hand, much attention has been paid to active materials of liquid crystals and now efforts aiming at dynamic diffractive optical elements using liquid crystals have established a method which provides such elements using liquid crystals (CLEO, Technical Digest, CTho34 (1998)). However, this method involved problems, in a process that a liquid crystal is filled in on the diffraction grating, such as that the diffraction efficiency is dependent on the precision with which the original diffraction grating is fabricated and that the response speed of the liquid crystal becomes slower because a grating is substituted for the oriented film which is used for the liquid crystal, etc. Moreover, any hologram which uses a liquid crystal in fabrication, including those made by the aforesaid method, has not only a complicated structure but also a decreased grain size and degraded efficiency because area of the hologram is divided into sections and these sections are provided with respective electrodes on which different voltages are applied, as mentioned above.

By the way, there is other type of hologram proposed lately, in which polarization characteristic of a minute grating is used to modify the polarization state in order to realize amplitude modulation of light, but this method is also difficult to fabricate ("Design of diffractive optical elements modulating polarization, " V. VKotlar, O. K. Zalyalof, Optik, Vol. 105, No.1, pp.1–6 (1997).

In addition to this, polarization plane rotation (i.e. rotation of the plane of polarization) becomes a big problem to be solved in optical apparatuses and optical elements such as polarizing microscopes, high numerical aperture objective lenses for the optical disk, etc. For example, an optical element called rectifier has been used to correct the polarization plane rotation caused by a high numerical aperture objective lens itself in the polarizing microscope. When the angle of incidence is large, the transmittance for linearly polarized light whose electric e field vector vibrates in a plane of incidence (p-polarization) and that for linearly polarized light whose electric field vector vibrates perpendicularly to the plane of incidence (s-polarization) do not coincide with each other. Therefore, when the incident light whose electric field vector forms an angle other than 0° or 90° to the plane of incidence (that is, when the light is neither only p-polarized light nor only s-polarized light), there inevitably occurs the polarization plane rotation. This polarization plane rotation can be corrected by the use of a combination of a half-wavelength plate and a null lens having zero refracting power.

Also, when light passes through a birefringent material or a medium in which residual birefringence occurs due to stress etc, the polarization state of the transmitted light is changed. These changes in the polarization state cause significant decrease in sensitivity of optical systems for detecting polarized light such as polarizing microscopes. Also, in a polarizing microscope having a high numerical aperture, light with a large angle of incidence exhibits a focused spot with a diffraction patter similar to that of astigmatic aberration in the plane of observation. This leads to degradation of the resolution and hence becomes a big problem together with degradation in sensitivity due to deterioration of the extinction ratio.

Similarly, in magneto-optical disks, large angle of incidence of light thereto causes the polarization plane rotation. Moreover, when a disk substrate has residual birefringence, reflected light suffers change of the polarization state. Furthermore, when a disk has a multi-layered structure such as those of magneto-optical disks etc., reflected light undergoes change of its phase because of interference of reflected light beams generated at respective layer boundaries, hence causing the change of the polarization state, and also the structure of grooves on the disk shows polarization-dependency due to diffraction.

In magneto-optical disks, the signal is reproduced by Kerr effect due to a magneto-optical effect of incident light, but typically the rotation angle of Kerr effect is as small as approximately 0.20° to 0.50°. The signal is detected by separating polarized light in the magneto-optical signal light when detecting the signal, but light other than the light to be detected may filter in the signal light that is generated by the polarization plane rotation due to a high numerical aperture of the lens and a large angle of incidence of light to the disk. It is well considered that this component is almost a DC component, which varies sensitively to the output signal from a semiconductor laser, its focusing error and tracking error, etc. and hence causes deterioration of the S/N ratio of the signal. Therefore, any variation factors causing the change of the polarization state except that caused by the signal should be removed as much as possible. The polarization plane rotation was not so far a major problem in magneto-optic disks, but lately this has become a significant problem in conjunction with increasing numerical aperture of the objective lens.

SUMMARY OF THE INVENTION

The present invention has been devised in consideration of the situation described above and it is the object of the present invention to provide both an optical element capable of controlling the polarization state spatially by the use of a liquid crystal and an optical apparatus capable of correcting the polarization state in conformity to a particular purpose by the use of the liquid crystal as well as their manufactures.

The optical element according to the present invention comprises a liquid crystal element in which a liquid crystal is provided in contact with an oriented film, characterized in that the direction of orientation of liquid crystal molecules of the aforesaid liquid crystal are made to vary spatially (i.e. in a position-dependent manner), so that the polarization state of light is controlled spatially.

The optical apparatus according to the present invention is characterized in that the optical apparatus contains an optical element comprising a liquid crystal element which further comprises a liquid crystal disposed in contact with a oriented film, wherein the direction of orientation of liquid crystal molecules of the aforesaid liquid crystal are made to vary spatially so that the polarization state of light which is processed at the aforesaid optical element is controlled spatially and that the optical apparatus performs correction of polarized light by use of this optical element.

Method for manufacturing an optical element and method for manufacturing an optical apparatus according to the present invention are characterized in that, in manufacturing the optical element wherein the direction of orientation of liquid crystal molecules of the aforesaid liquid crystal caused by an oriented film is varied spatially and hence polarization of light processed (i.e. refracted or reflected) thereby is controlled spatially or in manufacturing an optical apparatus provided with the aforesaid optical element, each of the manufactures involves a step selected from a group consisting of: a step of performing light irradiation on an oriented film by using masks while the polarization state is being varied; and a step of performing light irradiation on an oriented film by using light irradiating means while the aforesaid oriented mask is being moved relative to the light irradiating means; and accordingly controllability of orientation that the direction of orientation of the aforesaid liquid crystal molecules is made to vary spatially is endowed to the aforesaid oriented film.

In this way, in the present invention the direction of orientation in the oriented film of the optical element comprising a liquid crystal is made to vary discretely or continuously, and thereby the direction of orientation of the liquid crystal is varied spatially (in a position dependent manner), so that polarization state of the incident light can be transformed to an arbitrary distribution of polarization states (arbitrary distribution of position-dependent polarization states).

BRIEF DESCRIPTION OF THE DRAWINGS

FIG. 15 is a conception diagram of the index ellipsoid with an external electric field applied.

FIG. 16 is a conception diagram of the index ellipsoid with an external electric field applied so as to orient the liquid crystal molecules parallel to a direction of the electric field.

FIGS. 21A to 21E are conception diagrams showing polarization states at various stages in the optical system for manufacturing a rectifier.

FIG. 24 is a conception diagram showing a distribution of directions of polarization of light transmitted through a diffraction grating liquid crystal oriented film.

FIG. 25 is an illustration showing directions of orientation of a liquid crystal oriented film for a zone plate.

DETAILED DESCRIPTION OF THE PREFERRED EMBODIMENTS

Figure 1:
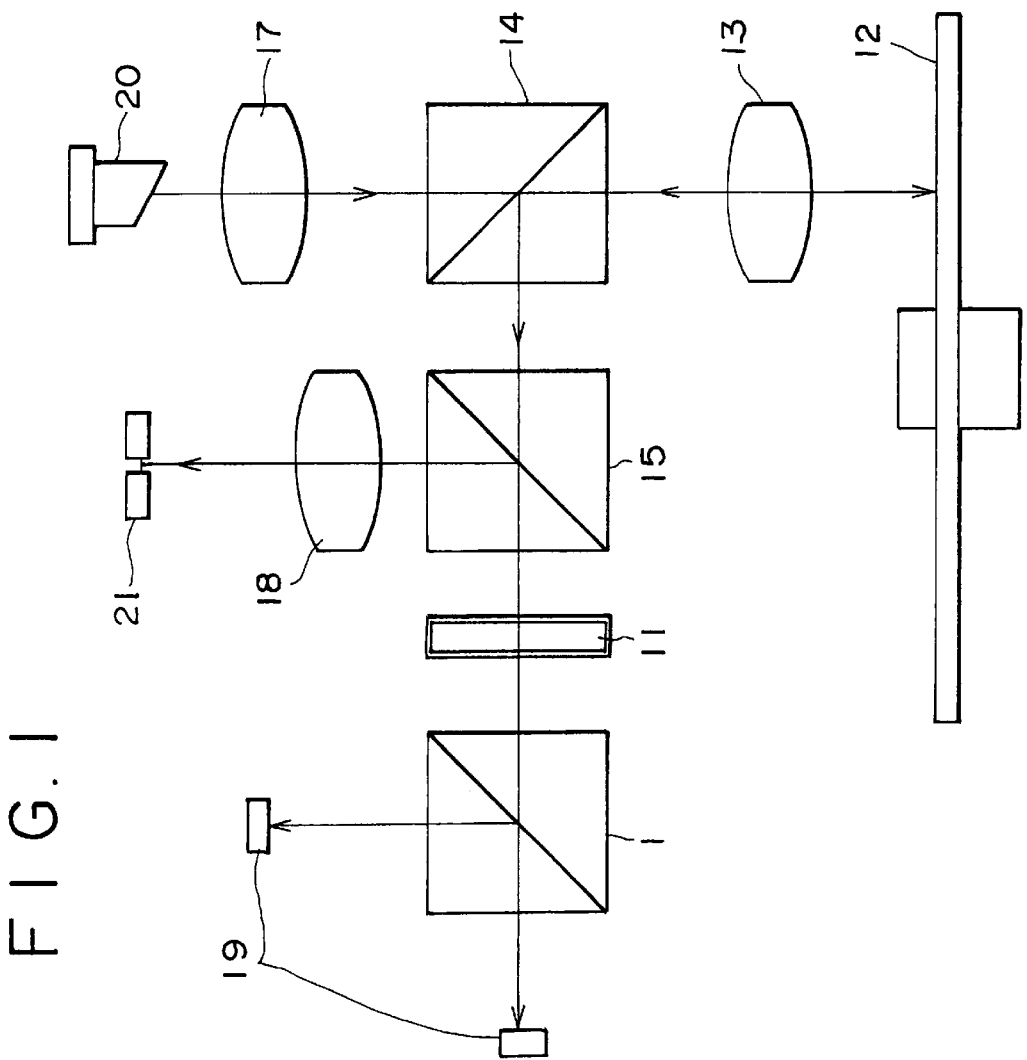
FIG. 1 is a schematic view of an optical system for the optical disk apparatus of one embodiment according to the present invention.

Thereafter, the present invention will be described in a case in which it is applied to an optical apparatus, more specifically optical disk recording and/or reproducing apparatuses. Liquid crystal molecule show a marked tendency to arrange themselves along the direction of orientation of an oriented film, and if the orientation in the oriented film is changed at each position, liquid crystal molecules can be oriented to any direction that is desired for an application. Further, if an electric field is applied to this structure, the amount of birefringence can be controlled.

Here theoretical treatment concerning the present invention will be described. Suppose that a liquid crystal is in a nematic phase and has a positive uniaxial polarization characteristic. Further, suppose that incident light is a polarized light having a Jones vector $(V_x, V_y)$ and travelling in z direction, and liquid crystal molecules are oriented in such a direction that the major axis thereof forms angle $\theta$ to the y-axis when no external electric field is applied to a structure of the liquid crystal and oriented film. In this case, the delayed phase axis forms angle $\theta$ to the z-axis. Here, if using Jones vector, the polarization state of transmitted light is given in the following equation, Equation 1:

$$\begin{pmatrix} V'_x \\ V'_y \end{pmatrix} = R(-\theta) \cdot W_o \cdot R(\theta) \cdot \begin{pmatrix} V_x \\ V_y \end{pmatrix} \quad (1)$$

where R and $W_o$ are matrices giving rotation of the coordinate axis and phase retardation in the liquid crystal, respectively, and given by the following equation, Equation 2:

$$R(\theta) = \begin{pmatrix} \cos\theta & \sin\theta \\ -\sin\theta & \cos\theta \end{pmatrix} \quad (2)$$

$$W_o = e^{-i\phi} \begin{pmatrix} e^{-i\frac{\Gamma}{2}} & 0 \\ 0 & e^{i\frac{\Gamma}{2}} \end{pmatrix}$$

where the amount of phase retardation $\Gamma$ and averaged phase $\phi$ are given, with the thickness of liquid crystal layer d, the velocity of light in vacuum c, the angular frequency of the light $\omega$, the refractive index of the advanced phase axis $n_f=n_0$, and the refractive index of the delayed phase axis $n_s=n_0$ ($n_s>n_f$):

$$\Gamma = (n_6 - n_f)\frac{\omega \cdot d}{c} \quad (3)$$

$$\phi = \frac{n_6 + n_f}{2}\frac{\omega \cdot d}{c}$$

For example, for linearly polarized light $(V_x, V_y)=(0,1)$, Equation 2 becomes:

$$\begin{pmatrix} V'_x \\ V'_y \end{pmatrix} = R(-\theta) \cdot W_o \cdot R(\theta) \cdot \begin{pmatrix} 0 \\ 1 \end{pmatrix} = \begin{pmatrix} -i \cdot \sin 2\theta \cdot \sin\frac{\Gamma}{2} \\ \sin^2\theta \cdot e^{-i\frac{\Gamma}{2}} + \cos^2\theta \cdot e^{i\frac{\Gamma}{2}} \end{pmatrix} \quad (4)$$

Consequently, one can generate an arbitrary polarization sate in outgoing light by changing the angle θ which is formed between the direction of orientation in the oriented film and the direction of polarization of light and the amount of phase retardation. Specifically, in order to generate linearly polarized light with an arbitrary direction of polarization, one is requested to set $\Gamma=\pi$ in the liquid crystal to have a half-wavelength plate, that is, $$\begin{pmatrix} V'_x \\ V'_y \end{pmatrix} = \begin{pmatrix} \sin 2\theta \\ \cos 2\theta \end{pmatrix} \quad (5)$$

and hence obtain linearly polarized light. The direction of polarization of the linearly polarized light is determined by the direction of orientation in the oriented film θ. Although the angle θ formed between the direction of orientation in the oriented film and the direction of polarization of the incident light is fixed, the amount of phase retardation Γ can be changed by changing an external electric field as is described in the following. Needless to say, this structure does not need any rotation or translation mechanism to change the amount of phase retardation, and hence the structure is inherently simple and suitable for device applications.

When an external electric field is applied to this structure, the liquid crystal rotates in the z-axis direction. In accordance with this, the optic axis also rotates in the z-axis direction. When the optic axis of the liquid crystal makes angel α to the z-axis, normal incident light of extraordinary ray senses the refractive index $n_e(\alpha)$ which is given by:

$$\frac{1}{n_e(\alpha)^2} = \frac{\cos^2\alpha}{n_o^2} + \frac{\sin^2\alpha}{n_e^2} \quad (6)$$

If one substitutes $n_e(\alpha)$ for $n_3$ appeared in preceding equations, one can obtain the polarization state of the transmitted light when an external electric field is applied. While, when no external electric field is applied to the structure, the extraordinary refractive index becomes $n_e(\alpha)= n_e$ for $\alpha=90°$, that is, the structure exhibits the maximum birefringence to the normal incident light. As the external electric field increases, the birefringence decreases, and when angle $\alpha=0°$, the extraordinary refractive index reduces to $n_e(\alpha)=n_o$, that is, the birefringence disappears for the normal incident light. In other words, one can generate an arbitrary polarization state by changing the strength of the external electric field.

Figure 17:
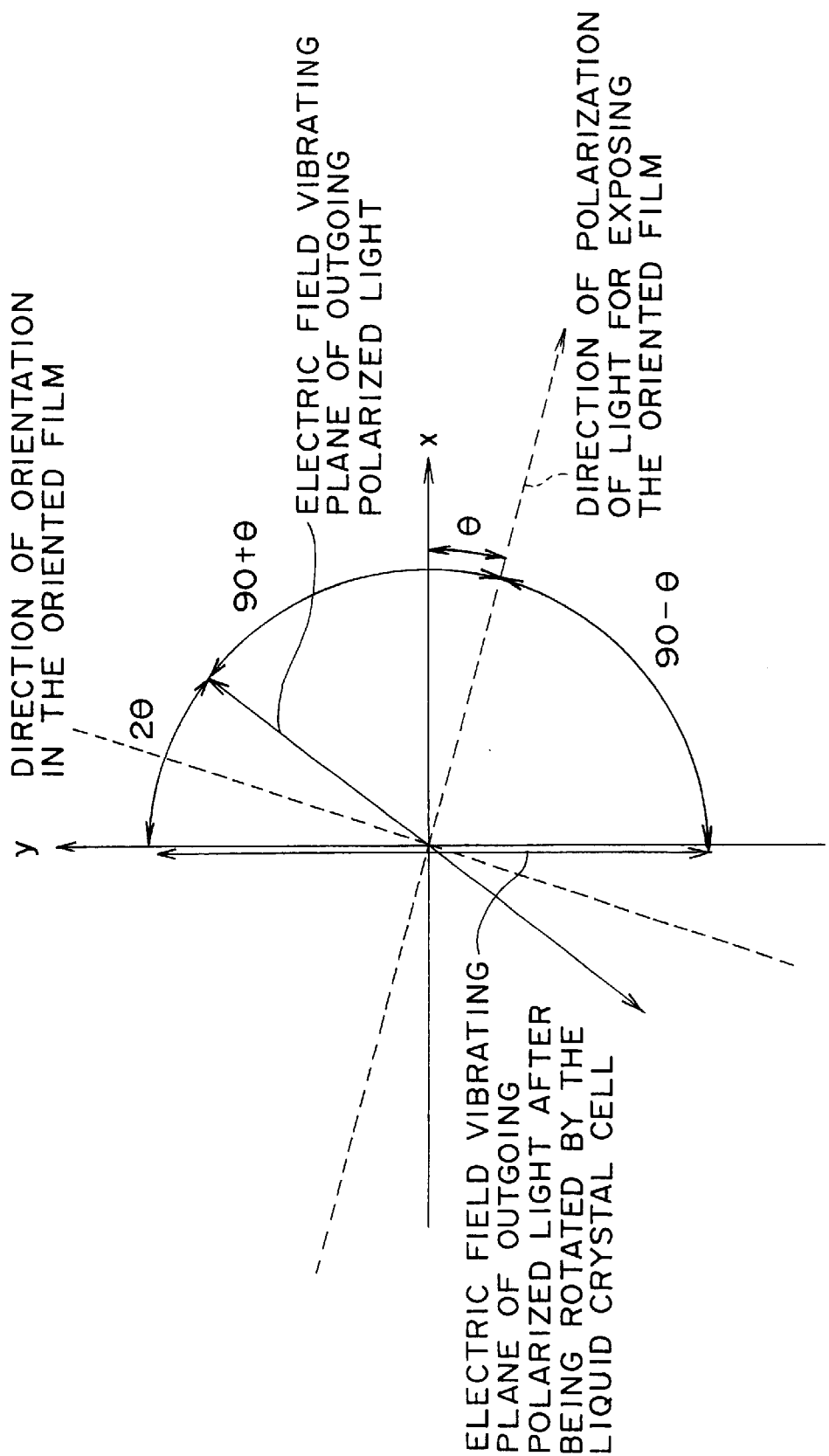
FIG. 17 is a conception diagram showing a direction of outgoing polarized light transmitted through a polarization plane rotation optical system and the direction of orientation in the oriented film.

By using the aforesaid optical element using liquid crystal, on can correct the polarization plane rotation. FIG. 17 schematically shows this idea. Here we consider how to perform correction of the polarization plane rotation caused by an optical system that gives rise to polarization plane rotation of the incident light by the amount of 2θ in a clockwise direction from the y-axis, transforming outgoing light transmitted through the optical system to a polarized light of the original direction of polarization. If the oriented film is exposed by linearly polarized ultraviolet light which is polarized in a direction of 90+θ° from the y-axis, the oriented film is oriented in a direction of θ° from the y-axis. If a voltage which causes $\Gamma=\pi$ is applied to a liquid crystal cell using this oriented film, polarized light transmitted through this cell has a direction of polarization which coincides with the y-axis direction. Hence, the correction of the polarization plane rotation is made possible. By the way, if one adopts one of directions of polarization of exposure light, 90°, 180°, and 270°, one can obtain an optical element with the same function.

Manufacturing method

First, the photo-orientation method using exposure by polarized ultraviolet light (A) will be explained.

By this method, the oriented film can be oriented in an arbitrary direction at each point therein. For exposure light sources, most inexpensive, ultraviolet light generating arc lamps such as xenon lamps in conjunction with a polarizing filter can be used, and excimer lasers which have originally a polarization characteristic, ultraviolet light generated by wavelength conversion of solid lasers, and gas lasers are also usable. Among these light sources, the third and forth harmonics of Nd:YAG lasers are especially most suitable for the purpose because of their capability for continues oscillation, excellent controllability, high output power as well as their productivity and ease of operation.

Figure 19:
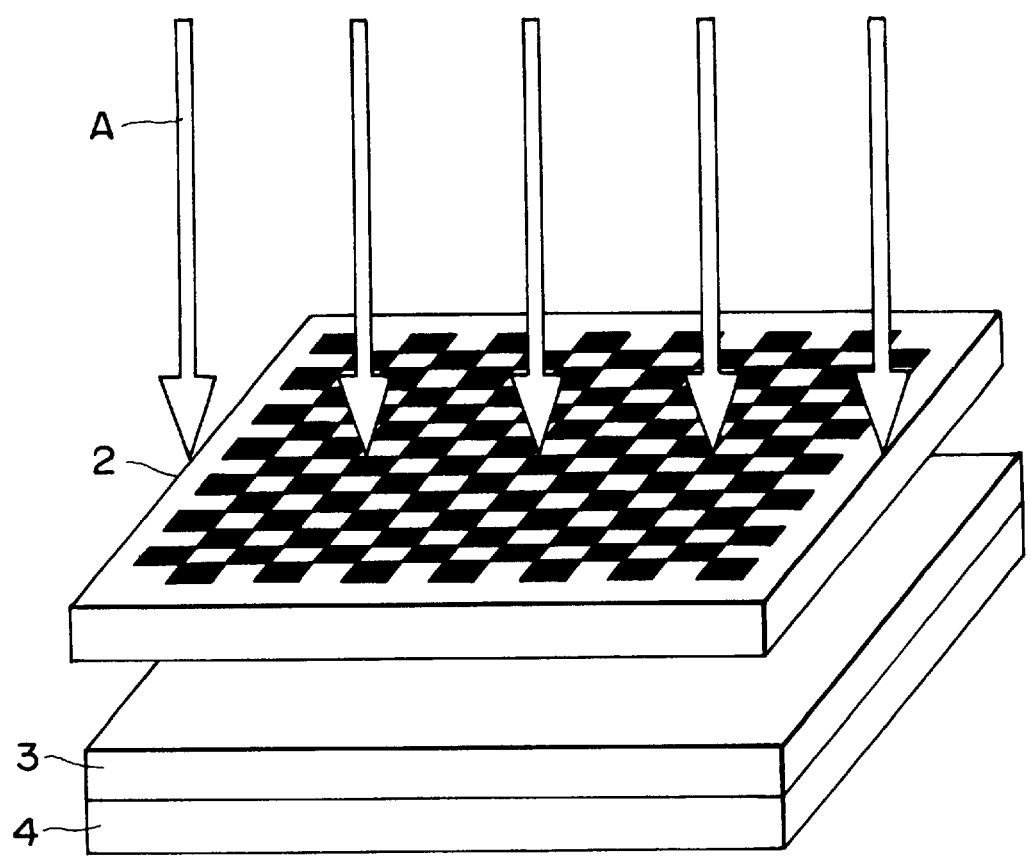
FIG. 19 is a conception diagram showing exposure of the oriented film by using a translation stage.
Figure 20A:
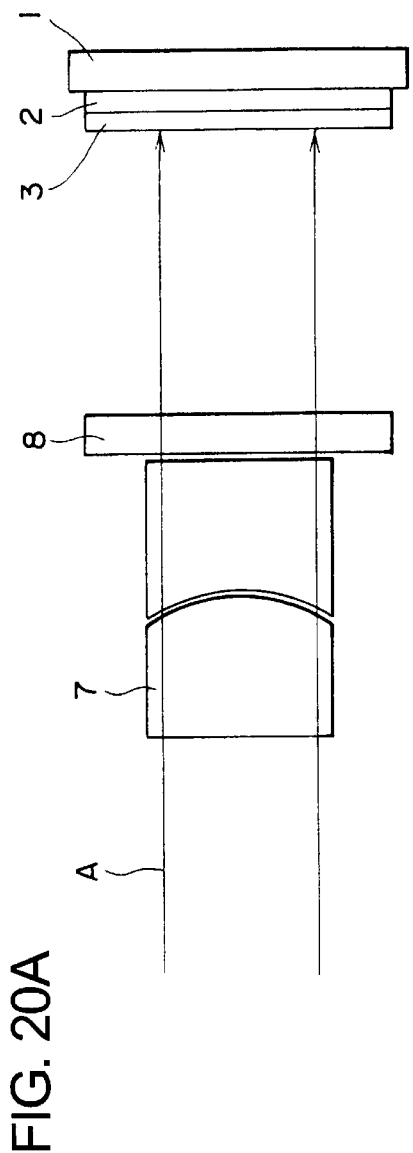
FIGS. 20A–D are conception diagrams showing an optical system for manufacturing a rectifier.
Figure 20D:
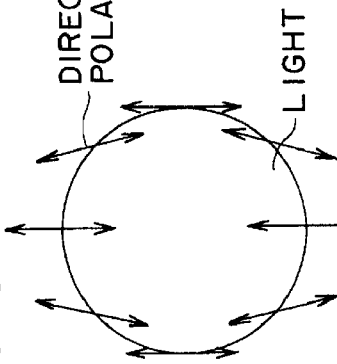
Figure 20C:
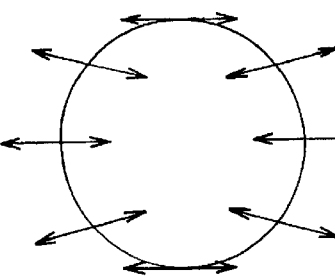
Figure 20B:
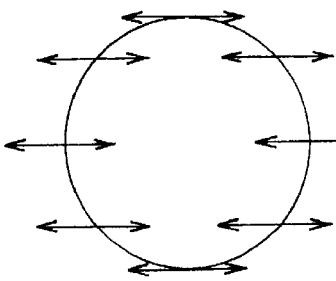

The current exposure technology which serves as a fine processing technology for electronic components such as semiconductor devices, liquid crystals, etc. can perform precision machining as fine as μ order or less. Based on this technology, if the polarization state of exposure light is varied for each of a plurality of masks, one can obtain an oriented film composed of a plurality of different areas each of which is oriented in a different direction corresponding to each exposure (FIG. 19).

Figure 18:
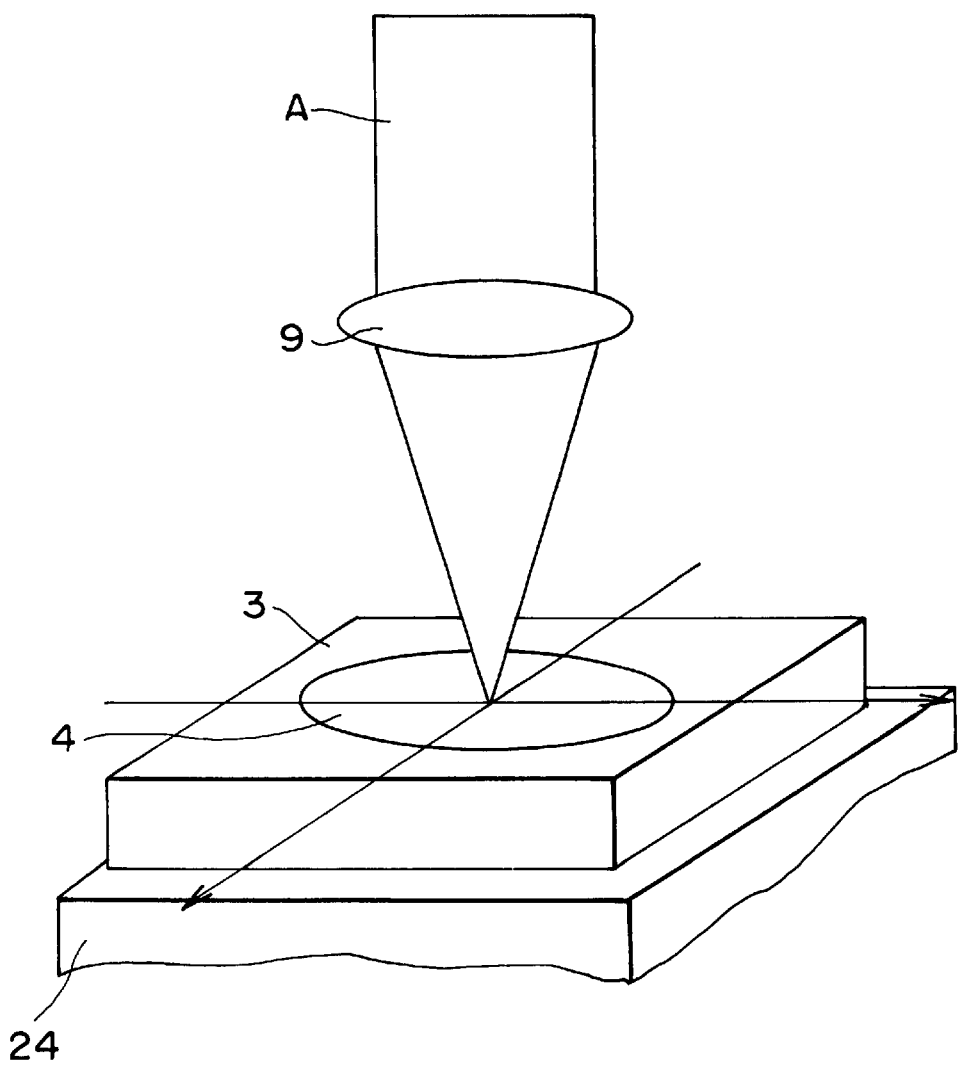
FIG. 18 is a conception diagram showing exposure of the oriented film by using masks.

Alternatively, if a substrate coated with the oriented film is disposed on a translation stage 23 and the oriented film is being moved and exposed by a focused spot of polarized ultraviolet light while the polarization state of the ultraviolet light is being varied, from one point to one point, one can obtain an oriented film with a desired distribution of directions of orientation (FIG. 18). Naturally, for scanning means for the aforesaid step, a rotation stage may be used instead. Further, alternatively, deflection means such as galvanomirrors, acoustooptic deflectors, electrooptic deflectors can be used for manipulating the spot. To change the polarization state of the exposure polarized light, optical means such as electrooptic elements, a wavelength plate (which will be rotated in use) can be used. Moreover, if one wants to control the direction of orientation in the oriented film only in one dimensional manner (namely, the directions of orientation are identical anywhere in a line), one can focus exposure light linearly by using a slit and/or a cylindrical lens and scan the substrate coated with the oriented film with the light focused in one dimension. By means of one of aforesaid means, the directions of orientation in the oriented film can be controlled freely in its plane. By virtue of the oriented film having such a distribution of directions of orientation in its plane in a position-dependent manner, the liquid crystal molecules on the oriented film are made to have a distribution of directions of orientation which are spatially modulated. This distribution state may be either in a discrete manner or in a continues manner.

Figure 21A:
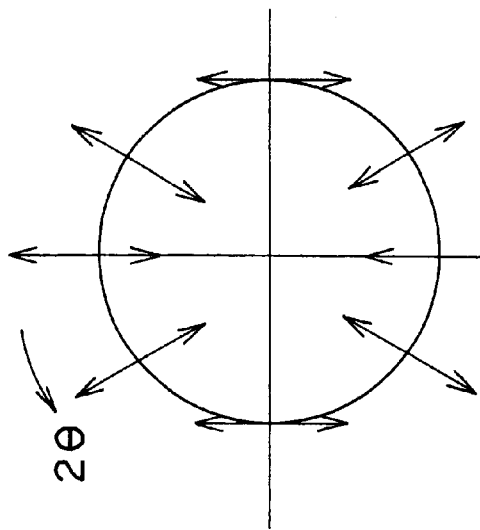
Figure 21B:
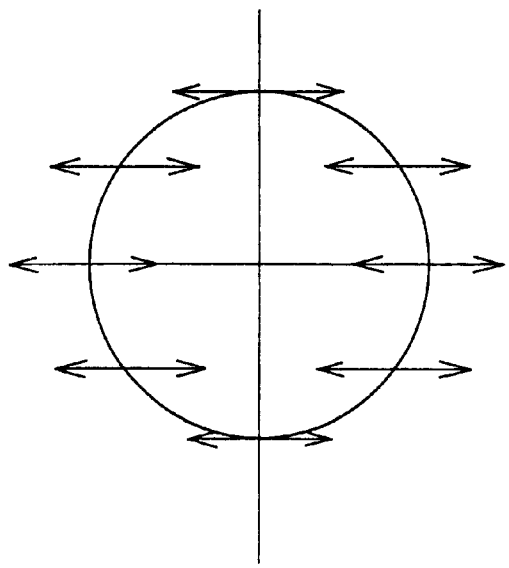

Further, in order to devise an optical component that has the same function as that of a rectifier for a polarizing microscope, it is recommendable to adopt, for example, the following measure (FIG. 20). Now, consider correction means for an optical system which emits polarized light as shown in FIG. 21B in response to incident polarized light shown in FIG. 21A. First, prepared is a lens 7 which rotates the direction of polarization of passing light by the amount of as much as half angle of the polarization plane rotation as that of an optical system to be corrected but has zero refracting power (i.e. null lens). Collimated linearly polarized ultraviolet light is allowed to enter the lens 7. FIG. 21C shows outgoing light transmitted through the lens 7. After the light passed through the lens 7, the direction of polarization of the light is rotated in a reverse direction by using a half-wavelength plate 8 whose neutral axis (delayed phase axis) is coincided with the direction of polarization of the incident linearly polarized light. FIG. 21B shows the polarization state after the transmitted light was reversely rotated. This polarized light is used to expose the oriented film. The direction of orientation in the oriented film is orthogonal to the direction of polarization of the exposure light. After the exposure, a liquid crystal cell is prepared using this oriented film and rotated by 90°. FIG. 21E shows the direction of orientation of the liquid crystal cell after being rotated. If the phase retardation as much as a half wavelength is given to the liquid crystal cell, an optical element for correcting the inherent polarization plane rotation of the target optical system can be obtained. In general, in order to obtain a desired distribution of polarization states of light, one can fabricate a liquid crystal oriented film having suitable distribution of directions of orientation for realizing it by irradiating the oriented film for liquid crystal by using a lens with no refracting power in the same way as described above.

Structure of optical element

The oriented film as described above is fabricated on a transparent electrode of a glass or plastic substrate. Two members thus formed are fixed together with oriented films being opposed to each other and with a spacing of about a few to a few tens of $\mu$m therebetween with a help of spacers, in which liquid crystal is filled in. For the transparent electrodes, ITO etc. can be used. If a voltage is applied to this transparent electrodes from the outside, the amount of rotation of the optic axis of the liquid crystal molecules to the optical axis direction can be controlled electrically, and hence the amount of birefringence can be controlled.

The structure of the optical element may be modified within the scope of the present invention as in the following examples.

Up to here, a transmission type element is mainly considered, but one sheet of substrates of the transmission type optical element may be substituted with a mirror and then a reflection type optical element is constituted. If alignment of the two oriented films is difficult to perform, one may adopt an alternative structure wherein spacing by the spacers is reduced as less as possible and only one sheet of the oriented film is used. Further, the two opposed sheets of oriented films do not necessarily have an identical direction of orientation to each other, and for example may have orthogonal directions, that is, twisted by 90° to each other, as is currently used in liquid crystal displays.

Generally, if the direction of orientation in the oriented film at the incident side is set parallel to the direction of polarization of the incident linearly polarized light and also the direction of orientation in the oriented film at the output side is set parallel to the direction of polarization of the outgoing linearly polarized light which is desired, one can obtain the desired polarized light. This configuration is known as a twisted nematic mode. As for liquid crystal modes, STN mode, GH mode, ECB mode, FLC mode, etc. are known besides this. When using one of these modes, provided that one designs an appropriate direction of orientation in the oriented film according to each mode, one can achieve the similar result as that of the twisted nematic mode.

Holographic optical elements which have hitherto been proposed are ones whose electrode structure is divided into electrode sections each of which is to be driven independently; while the holographic optical element according to the present invention has spatially divided areas of the oriented film wherein division of area is achieved only by the structure of the oriented film, it is not necessary to provide a plurality of electrodes, which is a great merit from a practical point of view. However, it may also be possible to provide an electrode structure comprising a plurality of divided electrodes in accordance with a particular purpose and apply different voltages to respective electrodes and the like, aiming at a sophisticated function.

Furthermore, as for a substrate, mainly a planar substrate is considered up to here. However a substrate may have a certain curvature of radius if needs be and also may have a microstructure therein such as diffraction grating. By the way, it is often the case that minute powdered plastic balls are used for spacers and this structure is suitable to make two sheets of substrates roughly parallel to each other. However, two sheets of different spacers may be used instead in order to form a prism shape or a wedge shape.

Presence and absence of external electric field

Voltages to be applied to the transparent electrodes can be of various forms such as DC, AC, pulse wave, continues wave, etc. Moreover, in the present invention, the oriented film serves to control the direction of orientation of liquid crystal molecules, and therefore exhibits maximum birefringence with zero external voltage. Accordingly, this component can be used as an inexpensive optical component which requires no electric field. Further if the component is rotated or translated instead of application of the electric field, the direction of orientation in the oriented film can be changed relative to the incident light.

Operation mode of the optical component (1) Independent Operation Mode

The present optical component alone can dynamically generate a desired distribution of polarization states spatially.

[Use of the Optical Component in Conjunction with an Analyzer]

A composition of a polarizer, an analyzer crossed to the polarizer, and the present optical component sandwiched with the polarizer and the analyzer can extract a polarized component in one direction. Therefore, the composition performs spatial intensity modulation. Naturally, if the incident light is linearly polarized light, the polarizer is unnecessary.

(2) Example of the Present Component as a Hologram and its Application

Possible operational principles of the present optical element which involves change of ray direction are considered to be a diffraction type and a refraction type. However, the liquid crystal has a high viscosity and its response speed to an external electric field decreases with increasing thickness of the liquid crystal. Refractive index difference between ordinary ray and extraordinary ray of liquid crystals is typically approximately 0.03. To attain an operating speed of the video rate, the thickness of the liquid crystal is limited to about 20 μm. Therefore possible optical path difference between the ordinary ray and the extraordinary ray is about 0.6 μm, and thus the optical element having such a small amount of path difference cannot be used as a refraction type optical element. Naturally, if an application performs minute control using such a small refractive index difference, this type of optical element can be used.

Hereafter, a diffraction type optical element will be described.

<Diffraction Grating>

The direction of orientation in the oriented film is denoted by θ in a clockwise direction from the y-axis (positive direction).

If θ is defined as $$\theta(x, y) = \frac{\pi}{\Lambda} x \quad (7)$$

when an electric filed $E_1$ causing γ=π is applied, outgoing light corresponding to y-direction linearly polarized incident light $(V_x, V_y) = (0, 1)$ is given by:

$$\begin{pmatrix} V'_x \\ V'_y \end{pmatrix} = \begin{pmatrix} \sin 2\theta \\ \cos 2\theta \end{pmatrix} = \begin{pmatrix} \sin 2\pi \frac{x}{\Lambda} \\ \cos 2\pi \frac{x}{\Lambda} \end{pmatrix} \quad (8)$$

If the outgoing light is allowed to pass through a polarizer and either of its x-component and y-component is extracted, the amplitude of outgoing light after the polarizer has a distribution of sinusoidal function spatially. That is, the optical element is a diffraction grating having sinusoidal function like transmittance. Hence, a transmitted light is decomposed into ± first order light etc. When the electric field is further increased to $E_2$ where the liquid crystal molecules are rotated to a direction perpendicular to the incident plane, no birefringence occurs and the incident light passes through the liquid crystal cell as it is. If the polarizer is set crossed to the outgoing light, the transmitted light disappears, and if a polarizer is set parallel to the outgoing polarized light, the transmitted light appears as it is. Therefore, if the electric fields $E_1$ and $E_2$ are changed over to each other, an electrically controllable diffraction grating which takes either of a diffraction grating state and a non-diffraction grating state can be devised.

Figure 22:
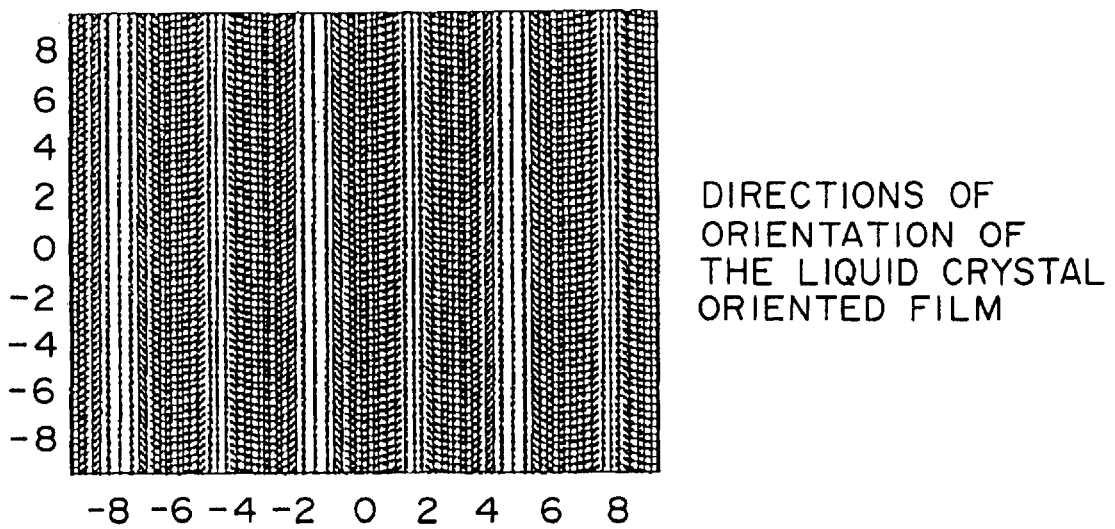
FIG. 22 is a view showing directions of orientation of a liquid crystal oriented film for a diffraction grating.
Figure 23:
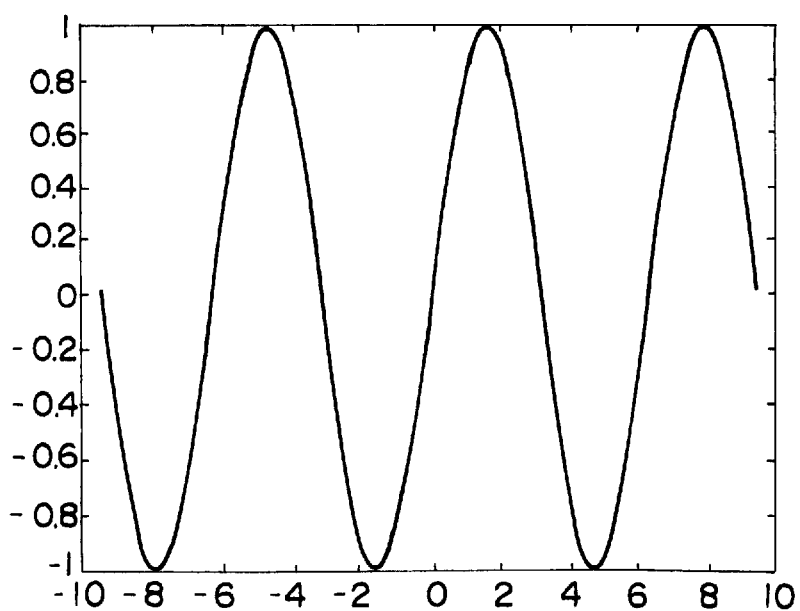
FIG. 23 is a conception diagram showing the amplitude of an x-direction polarized component after passing through a diffraction grating liquid crystal cell.
Figure 26:
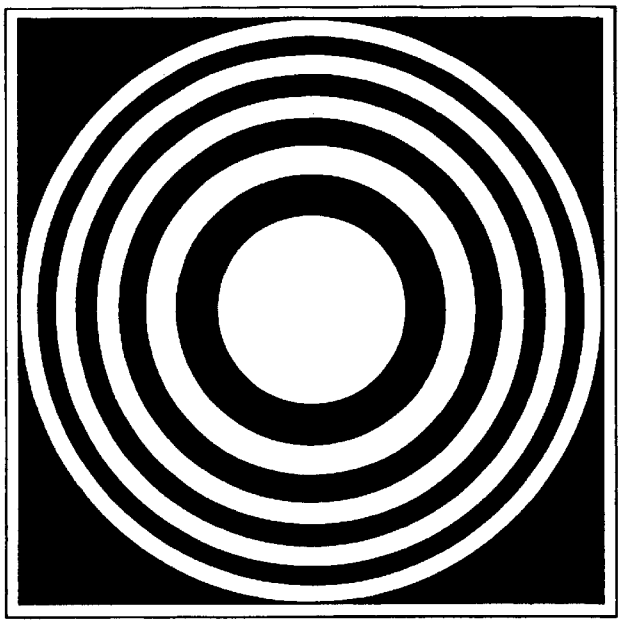
FIG. 26 is a conception diagram showing the amplitude of an x-direction polarized component after passing through a zone plate liquid crystal cell.

FIG. 22 shows directions of orientation of the liquid crystal oriented film, FIG. 23 shows the amplitude of an x-direction polarized light component after passing through the liquid crystal cell, and FIG. 24 shows a distribution of directions of polarization of the light transmitted through the liquid crystal oriented film. In this way a diffraction grating can be tailored to be of a discrete form or a continues form by rotating the optic axis of the liquid crystal periodically and hence making a diffraction grating have a discrete or continues characteristic. The variable diffraction grating using this liquid crystal optical element is inexpensive compared to the conventional modulators and polarizing components, and hence has a great merit in manufacturing.

(Hologram)

Figure 27:
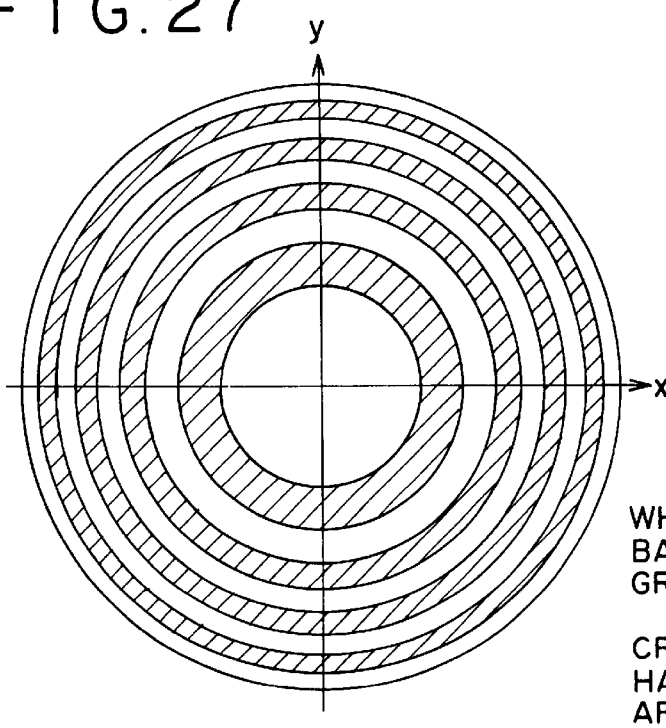
FIG. 27 is a conception diagram showing a distribution of directions of polarization of light transmitted through a zone plate liquid crystal oriented film.

If a hologram is considered for each spatial frequency component, it is assumed to be a superposition of diffraction gratings and hence fundamentally can be understood as the same as a single diffraction grating. That is, a hologram for an arbitrary pattern can be fabricated as an amplitude hologram by means of the present invention. Here, the most characteristic feature of the hologram in question is that each orthogonally polarized light generates a reversed diffraction pattern, respectively. For example, FIG. 25 shows a distribution of directions of orientation in the liquid crystal oriented film, FIG. 27 shows a x-direction polarized component of the light transmitted through the liquid crystal cell, and FIG. 27 shows a distribution of directions of polarization of the light transmitted through the liquid crystal cell. As is seen form these figures, a diffractive lens can be fabricated as a zone plate. In this case, the zone plate acts as a convex lens for each of two orthogonally polarized light, and therefore there occurs two foci on the optical axis and respective polarized light on the foci can be separated by polarizing means. By using this phenomenon, the polarization ratio can be measured. Moreover, if a pattern which generates respective foci having different focal length for the p-polarized light and for the s-polarized light is used, an optical disk whose thickness (form the surface to a recording layer) is different for each polarized light can be reproduced by using a hologram of the aforesaid pattern.

<Example of the Present Optical Element as a Polarization Spatial Corrector and Its Application>

The present optical element does not accompany with optical path translation and can be considered to be put in practical use a spatial polarizing filter. If this spatial polarizing filter is used in a polarization-dependent optical system such as an optical system whose purpose is to detect a polarized light, an optical system employing interference of light, etc., the polarization plane rotation caused by such optical system can be corrected spatially.

Figure 28A:
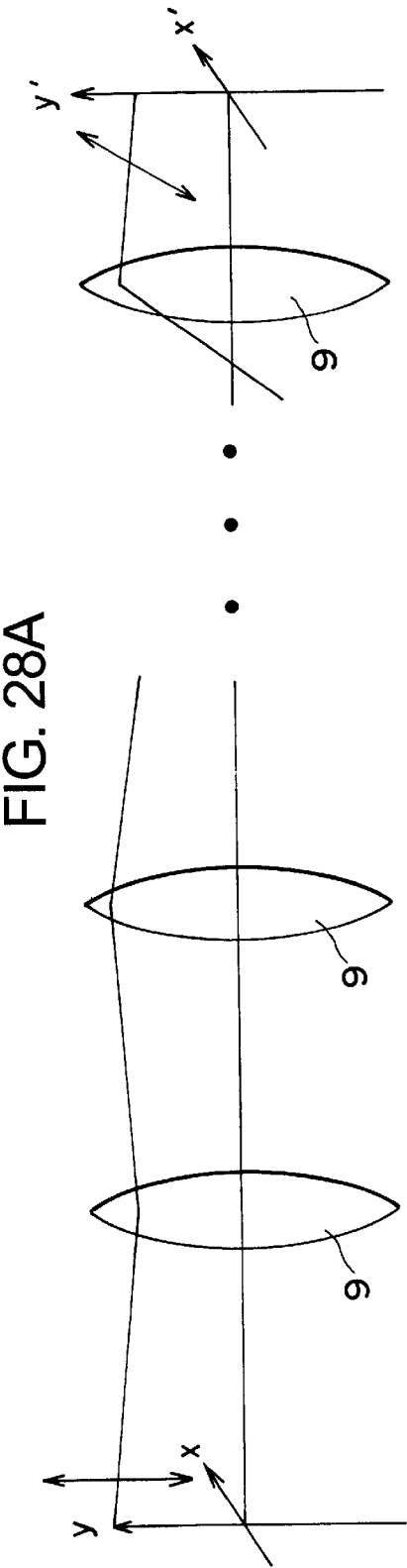
FIGS. 28A–C are illustrations showing the polarization plane rotation by an optical system.
Figure 28C:
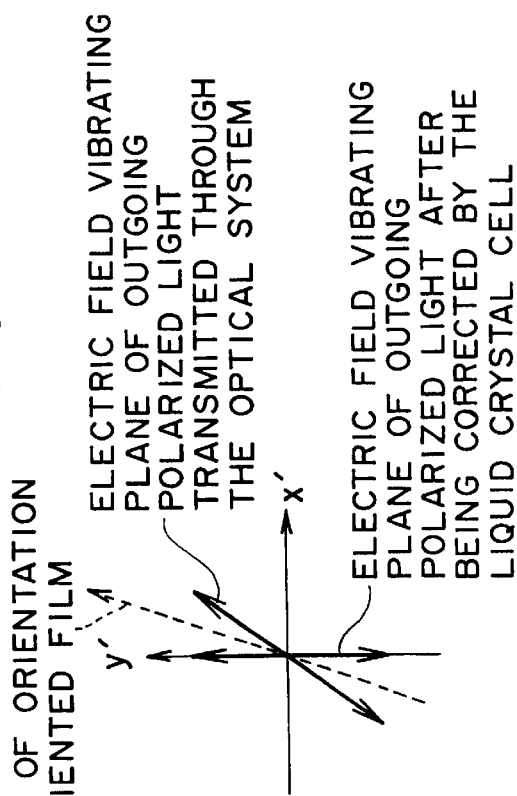
Figure 28B:
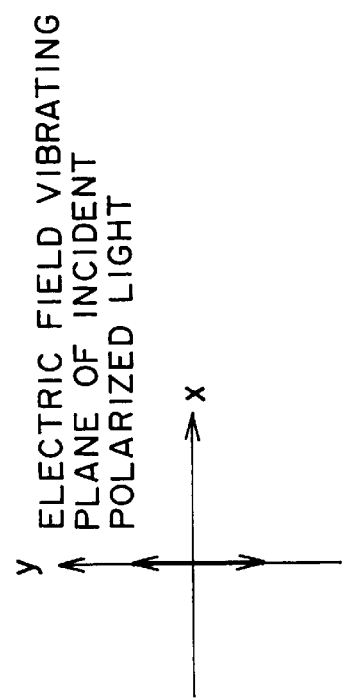

Here one example for this will be described, referring to FIG. 28. Suppose incident light is y-direction linearly polarized light (its electric field vibrating plane lying in a plane containing the y-axis and the optical axis). Numeral 9 is a lens. Suppose that outgoing light at a point (X', Y') of the exit plane (X'Y' plane) is linearly polarized light whose plane of polarization is rotated by θ=θ(X', Y')° in a clockwise direction when viewed from an observation point on the exit side. Here, θ is supposed to be a function of position(X', Y'). That is, the theoretical analysis is considered including a general case wherein the angel of polarization plane rotation is not uniform in the exit plane. At this moment, If one disposes in the exit plane a liquid crystal cell containing therein the oriented film that has been oriented in a direction rotated by φ=φ(X', Y')=θ(X', Y')/2° from the y-axis in a clockwise direction when viewed from an observation point on the exit plane and applies a voltage on the liquid cell that sets the amount of phase retardation as much as Γ=π, the liquid crystal cell serves as a half-wavelength plate whose neutral axis is in a direction rotated by θ/2° form the y-axis and the electric field vibrating plane of the polarized light rotates by −θ°, so that the electric field vibrating plane returns to a plane containing both the y-axis and the optical axis again. Therefore, the light transmitted through the liquid crystal cell become linearly polarized light whose direction of polarization is in the y-axis direction and the polarization plane rotation caused by the optical system is corrected.

Here, the incident polarized light and exit polarized light are assumed to be linearly polarized light at each point.

Further, in case incident light and/or outgoing light are not linearly polarized light but more generally elliptically polarized light, if one sets suitable direction of orientation in the oriented film and modify the voltage applied to each point in the liquid cell, one can freely control such polarized light spatially. However, in order to modify the voltage applied to each point in the liquid crystal cell independently, it is necessary to provide a plurality of electrodes on respective points and therefore the structure becomes too complex. In practical point of view, it is sufficient, in many cases, to assume the elliptically polarized light as linearly polarized light and then perform the calculation for linearly polarized light. Accordingly, even when the outgoing light is elliptically polarized light, if ellipticity is sufficiently small, that is, the polarized light is very close to linearly polarized light, one can attain a sufficient correction effect by simply rotating the major axis of the elliptically polarized light.

DETAILED DESCRIPTION OF THE PREFERRED EMBODIMENTS

Figure 2:
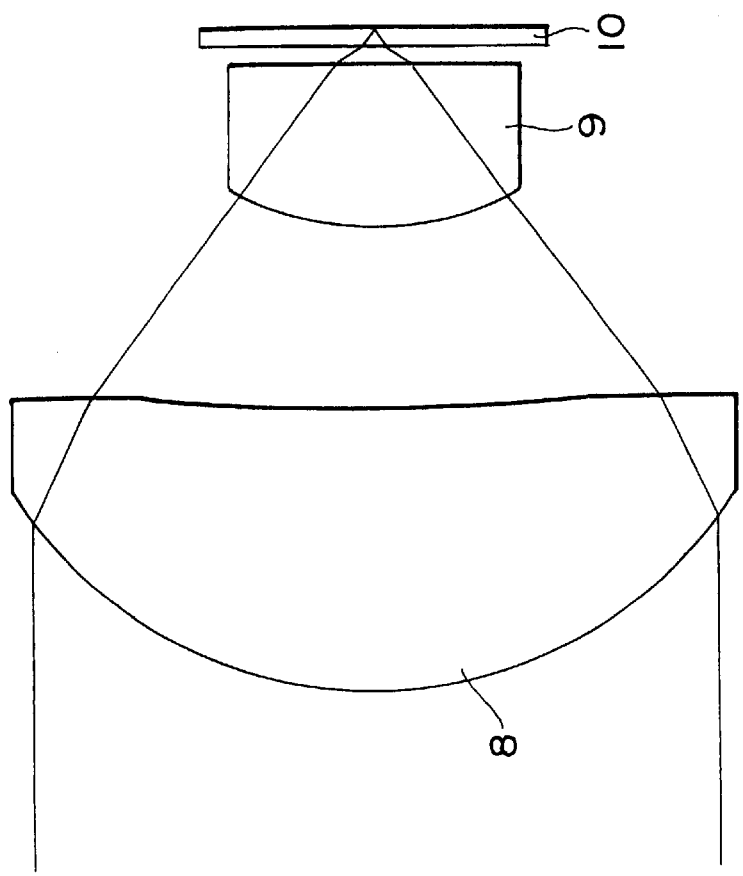
FIG. 2 is a schematic view of a light path of one embodiment according to the present invention.

Next, a specific design example according to the present invention will be described for an objective lens for optical disks whose lens construction is of two elements in two groups having a numerical aperture of 0.85. A design wavelength is 635 nm. An adopted structure is of infinite magnification. Refractive indices of H_LaF2, BK7, and polycarbonate are set to be 1.780421, 1.515014, and 1.57950, respectively. FIG. 2 shows optical path of the objective lens. Both p-polarized light and s-polarized light take different transmittance and reflectance in accordance to the angel of incidence. Therefore, in the optical system having a refraction plane which gives rise to a large angle of incidence as shown in this example, the polarization plane rotation inevitably occurs even when a material exhibiting birefringence is not used.

TABLE 1

| Plane No. | Radius of curvature | Separation of planes | Glass material |
|---|---|---|---|
| Object | | Infinity | |
| 1 | 2.240163 | 1.700975 | H_LAF2 |
| 2 | 35.965046 | 1.042206 | |
| 3 | 1.615944 | 0.981080 | BK7 |
| 4 | Infinity | 0.101322 | |
| 5 | Infinity | 0.1 | Polycarbonate |
| Image plane | | | |

When this objective lens is used in a magneto-optical disk optical system as shown in FIG. 1, a liquid crystal rectifier 11 is designed that corrects the polarization plane rotation caused by the objective lens at a position of returned light indicated in the figure. In the figure, numeral 12 denotes an optical disk, numeral 13 an objective lens, numerals 14 and 15 beam splitters, numeral 16 a polarizing beam splitter, numeral 17 a collimator lens, numeral 18 a condenser lens, numeral 19 a detector of a signal detection system, numeral 20 a laser diode (LD), 21 a detector of a servo signal detection system.

A procedure of calculation is as follows. First, ray tracing is performed, starting each point on the pupil, and the angle of incidence at each plane $\theta_1, \theta_2, \ldots \theta_6$ is obtained for each ray. For example, regarding a ray incident on a 70% height point of the pupil in the aforesaid design example, results of the ray tracing were obtained as shown in the next table, Table 2.

TABLE 2

| Plane No. | Angle of incidence (deg) | Exit angle (deg) | Angle of incidence (rad) | Exit angle (rad) | Incident side refractive index $n_1$ | Exit side refractive index $n_2$ |
|---|---|---|---|---|---|---|
| 1 | 36.06755 | 19.77173 | 0.629498 | 0.345082 | 1 | 1.740421 |
| 2 | 12.41213 | 21.96806 | 0.216633 | 0.383415 | 1.740421 | 1 |
| 3 | 6.675986 | 4.400913 | 0.116518 | 0.07681 | 1 | 1.515014 |
| 4 | 23.07668 | 36.4292 | 0.402764 | 0.63581 | 1.515014 | 1 |
| 5 | 36.4292 | 22.08146 | 0.63581 | 0.385394 | 1 | 1.57965 |
| 6 | 22.08146 | 36.4292 | 0.385394 | 0.63581 | 1.57965 | 1 |
| 7 | 36.4292 | 36.4292 | 0.63581 | 0.63581 | 1 | 1 |

For each plane, the amplitude transmittance ($t_p$, $t_s$), the amplitude reflectance ($r_p$, $r_s$), and the energy transmittance ($T_p$, $T_s$) can be calculated for both p-polarization and s-polarization as follows. The amplitude transmittance ($t_p$, $t_s$) and amplitude reflectance ($r_p$, $r_s$) for p-polarization and s-polarization are dependent on the angle of incidence.

Denoting refractive indices for incident side medium and exit side medium by $n_1$ and $n_2$, and the angle of incidence and the exit angle are denoted by $\theta_1$ and $\theta_2$, respectively, the aforesaid values are given by:

$$\begin{cases} r_p = \dfrac{-n_1\cos\theta_2 + n_2\cos\theta_1}{n_1\cos\theta_2 + n_2\cos\theta_1} \\ t_p = \dfrac{2n_1\cos\theta_1}{n_1\cos\theta_2 + n_2\cos\theta_1} \end{cases} \quad (10)$$

$$\begin{cases} r_s = \dfrac{n_1\cos\theta_1 - n_2\cos\theta_2}{n_1\cos\theta_1 + n_2\cos\theta_2} \\ t_s = \dfrac{2n_1\cos\theta_1}{n_1\cos\theta_1 + n_2\cos\theta_2} \end{cases}$$

$$\therefore T(\theta_1) = \begin{pmatrix} t_p & 0 \\ 0 & t_s \end{pmatrix} = \begin{pmatrix} \dfrac{-n_1\cos\theta_2 + n_2\cos\theta_1}{n_1\cos\theta_2 + n_2\cos\theta_1} & 0 \\ 0 & \dfrac{n_1\cos\theta_1 - n_2\cos\theta_2}{n_1\cos\theta_1 + n_2\cos\theta_2} \end{pmatrix}$$

In a generic way wherein the polarization plane rotation is taken into account, the amplitude transmittance is expressed by a matrix with 2 rows by 2 columns with respect to an electric field vector of the incident light ($E_p$, $E_s$). The electric field vector of the outgoing light ($E_p'$, $E_s'$) is given by:

$$\begin{pmatrix} E_p' \\ E_s' \end{pmatrix} = \begin{pmatrix} t_{pp}^n(\theta_n) & t_{sp}^n(\theta_n) \\ t_{ps}^n(\theta_n) & t_{ss}^n(\theta_n) \end{pmatrix} \cdot \begin{pmatrix} E_p \\ E_s \end{pmatrix} = T^n(\theta) \cdot \begin{pmatrix} E_p \\ E_s \end{pmatrix} \quad (14)$$

At this point, each of vector elements of the electric field vector and each of matrix elements of the transmittance matrix are complex numbers in a general case. However, the present design considers only refraction planes, and therefore off-diagonal matrix elements are real numbers, zero.

However, as described above, if there is an antireflection film in the optical path, outgoing light becomes elliptically polarized light and the direction of the major axis is rotated due to superposition of multiple reflection beams. By the way, if the incident side medium or exit side medium is an imperfect conductor and hence has absorption, the refractive indices $n_1$ and $n_2$ become complex numbers, but similar formula can stand. For an arbitrary polarized light, one may decompose the light into a p-polarized component and an s-polarized component and then consider each component. However, generally the amplitude transmittance or the amplitude reflectance for p-polarized component and that for s-polarized component do not coincide with each other. Therefore, ratio of the amplitudes of the p-polarized component and s-polarized component is changed after reflection or refraction and accordingly the direction of polarization of linearly polarized light rotates.

The amplitude transmission for each plane was calculated from Table 2 and the results are shown in next table, Table 3.

TABLE 3

| Cosine of the incident angle | Cosine of the exit angle | rp | tp | rs | ts | Tp | Ts |
|---|---|---|---|---|---|---|---|
| 0.8083 | 0.941 | 0.1984 | 0.6886 | −0.339 | 0.6609 | 0.9606 | 0.885 |
| 0.9766 | 0.9274 | −0.246 | 1.3122 | 0.294 | 1.294 | 0.9395 | 0.9136 |
| 0.9932 | 0.9971 | 0.2029 | 0.794 | −0.207 | 0.7934 | 0.9588 | 0.9575 |
| 0.92 | 0.8046 | −0.14 | 1.3032 | 0.268 | 1.268 | 0.9805 | 0.9282 |
| 0.8046 | 0.9267 | 0.1567 | 0.7322 | −0.291 | 0.7094 | 0.9755 | 0.9156 |
| 0.9267 | 0.8046 | −0.157 | 1.3322 | 0.2906 | 1.2906 | 0.9755 | 0.9156 |
| 0.8046 | 0.8046 | 0 | 1 | 0 | 1 | 1 | 1 |

From Table 3, the amplitude transmittance and the energy transmittance for p-polarization and those for s-polarization are found to be:

for a one way optical path, $T_P$=0.8073, $T_S$=0.6022, $t_p$=0.8985, $t_s$=0.7760;

for a round trip optical path, $T_P$=0.6517, $T_S$=0.3626, $t_p$=0.8070, $t_s$=0.6020.

Moreover, as for a coordinate system, a local coordinate system at the incident point (r cos φ, r sin φ) is adopted to describe p-polarized light and s-polarized light in the course of theoretical discussion. The local coordinate system is linked to an orthogonal coordinate whose z-axis is the optical axis with the relationship of the following formula, $$\begin{pmatrix} E_p \\ E_s \end{pmatrix} = \begin{pmatrix} \cos\phi & \sin\phi \\ -\sin\phi & \cos\phi \end{pmatrix} \cdot \begin{pmatrix} E_x \\ E_y \end{pmatrix} \quad (9)$$

If one performs this calculation at each incident point on the pupil and carries out curve-fitting, the transmittance for p-polarization and that for s-polarization on each point (α cos θ, α sin φ) on the exit pupil can be obtained as:

$r_p(\alpha)$=0.8425+0.02894α−0.077726α²+0.36014α³−0.20315α⁴

$r_s(\alpha)$=0.84178+0.057623α−0.47109α²+0.77805α³−0.58556α⁴ (11)

In the calculation, only meridional rays propagating in a plane containing the optical axis are considered and the effect of skew rays is omitted.

Hereafter, the Incident light is assumed to be linearly polarized light having only a y-direction component ($E_x$, $E_y$)=(0, 1). If the incident light is expressed using a p-polarized component and an s-polarized component for each position (α cos φ, α sin φ) in the plane, then ($E_p$, $E_s$)=(cos θ, sin φ). Therefore the outgoing light is given by:

$$\begin{pmatrix} E'_p \\ E'_s \end{pmatrix} = \begin{pmatrix} r_p(\alpha) \cdot \cos\phi \\ r_s(\alpha) \cdot \sin\phi \end{pmatrix} \quad (12)$$

Figure 3A:
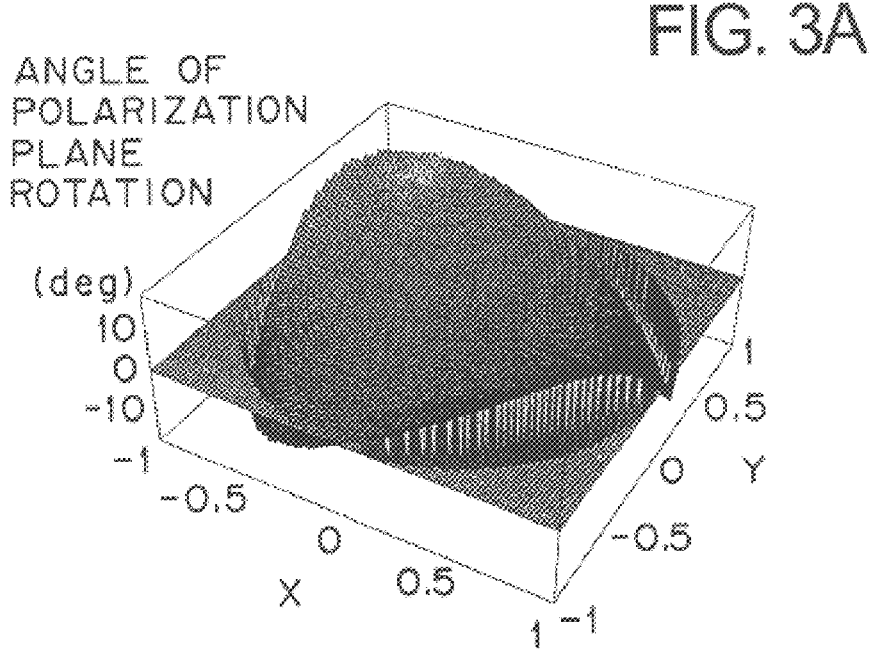
FIG. 3A is a conception diagram showing the angle of polarization plane rotation of Embodiment 1 with no anti-reflection coating.
Figure 3B:
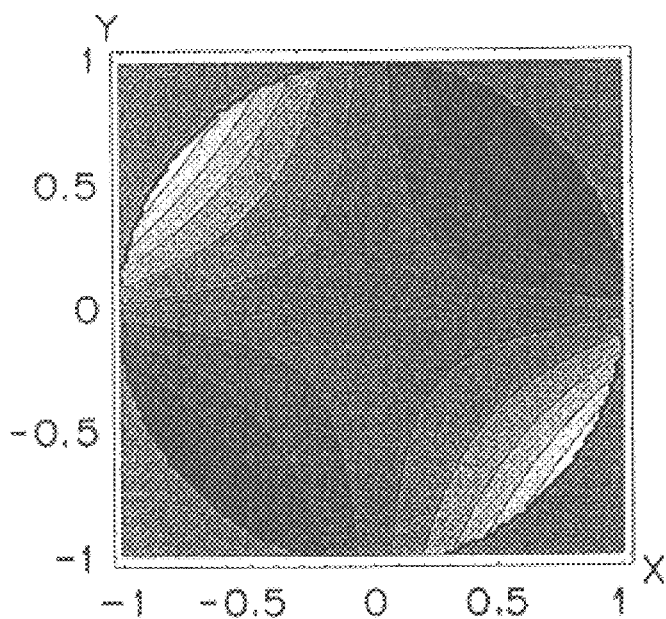
FIG. 3B is a contour map of the diagram of FIG. 3A.

The angle of polarization plane rotation of the outgoing light to the incident light for each point on the pupil was calculated, with a clockwise angle taken as positive, and the results are shown in FIG. 3. Form the results, the direction of orientation in the oriented film which is necessary to reverse the direction of polarization to the y-axis direction can be found by the aforesaid formula. The direction of orientation of the liquid crystal φ(°), which is measured from the y-axis in a clockwise direction, necessary to transform the aforesaid polarized light to y-direction polarized light which is the same as the incident light is given by, for the angel of polarization plane rotation θ(°) of linearly polarized light which is measured from the y-axis in a clockwise direction, $$\phi = 90 \cdot m + \frac{\theta}{2} \quad (m = 0, \pm 1, \pm 2, \ldots) \quad (13)$$

Figure 4A:
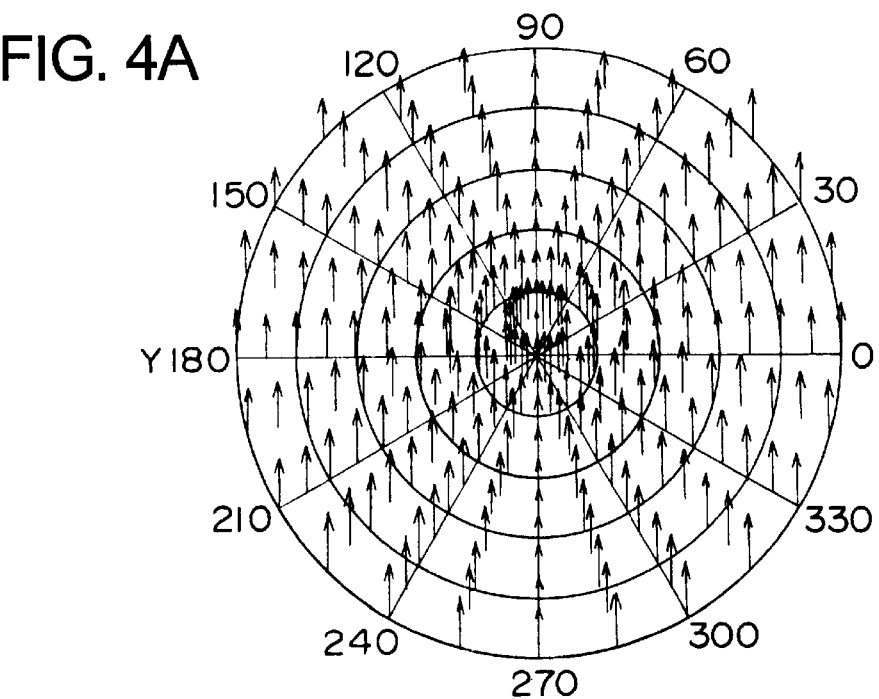
FIG. 4A is a conception diagram showing the directions of orientation in the oriented film which is used for an optical element for correcting the polarization plane rotation of Embodiment 1 with no antireflection coating.
Figure 4B:
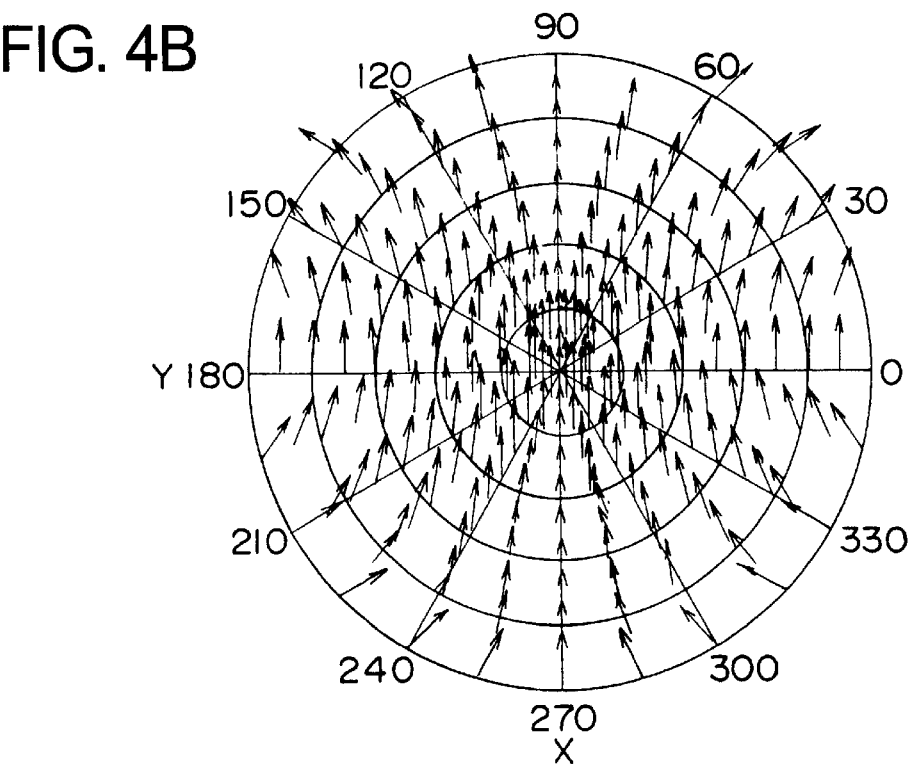
FIG. 4B is a conception diagram similar to FIG. 4A with the azimuthal angle from the y-axis being increased tenfold.

FIG. 4 shows results calculated by this formula for a case of m=0. If one intends to change the direction of orientation in the oriented film continuously, one need orient the oriented film in the direction of arrows indicated in the figure, changing its direction gradually as shown in the figure. If one intends to change the direction of orientation in the oriented film discretely, one need fabricate a plurality of masks for respective areas defined by contours in the figure, each of which corresponds to typical direction of orientation thereof, perform exposure using each mask by each exposure light corresponding to the aforesaid typical direction of polarization, and repeat it for all masks while the direction of polarization of the exposure light is changed for each mask. Alternatively, one need perform irradiation by using an optical system for generating light which has such a polarization characteristic as can form this distribution of directions of orientation on the oriented film. If a liquid crystal cell is fabricated using this oriented film and a half-wavelength voltage is applied on the liquid crystal, position-dependent polarization plane rotation is corrected.

In the above example, the simplest case of the refractive plane is treated. Moreover, also regarding various planes the amplitude transmittance or reflectance can be found. For example, in order to prevent the quantity of light loss due to reflection, coating is generally provided on a surface of an optical element and multiple reflection inside this thin film causes change of the direction of polarization and the ellipticity of outgoing light. Reflected polarized light at a thin film and refracted polarized light transmitted therethrough undergo change of their phase due to interference of multiple refection beams therein.

Here, this phenomenon will be descried for a single layer film coating. Refractive indices of mediums 1, 2, and 3 are denoted by $n_1$, $n_2$, and $n_3$, respectively, and the thickness of the medium 2 is denoted by d, the angle of incidence from the medium 1 to the medium 2 by $\theta_1$, and the exit angle from the medium 1 to the medium 2 by $\theta_2$, and the exit angel form the medium 2 to the medium 3 by $\theta_3$. The light makes multiple reflection in the medium 2. At this moment, the optical path difference L between multiple reflection beams is given by:

$$L = \frac{2n_2 d}{\cos \theta_2} \quad (15)$$

It is assumed that each of the mediums 1, 2, and 3 has neither isotropy nor birefringence. In this case, optical characteristics for p-polarization and that for s-polarization can be treated with a common form, and therefore a case for p-polarization will be considered in the first place for simplicity. The amplitude of incident light in the medium 1 is denoted by $A_{op}$, and the amplitude transmittance and the amplitude reflectance at the boundary of the mediums 1 and 2 are denoted by $t_p$ and $r_p$, respectively. Now, the amplitude of outgoing light $A_p$ is expressed by superposition of multiple reflection beams as follows:

$$A_p = t_p t'_p A_{0p} + t_p r'_p r_p t'_p e^{i(kL)} \cdot A_{0p} + t_p (r'_p r_p)^2 t'_p e^{i(2kL)} A_{0p} + \ldots = \quad (16)$$
$$\frac{t_p t'_p e^{-i(kL)}}{1 + r'_p r_p e^{-2i(kL)}} A_{0p} = T_p A_{0p}$$

For example, if one considers a quarter wavelength film (thickness $d=\lambda/4$) for a single layer antireflection coating, term kL is given by $$kL = \frac{2\pi}{\lambda} n_2 d \cos\theta_2 = \frac{2\pi}{\lambda} \frac{\lambda}{4} \cos\theta_2 = \frac{\lambda}{2} \cos\theta_2 \quad (17)$$

The term kL for s-polarization can also be treated similarly. Due to the interference of multiple reflection beams, any incident light with the angle of incidence except 0° (i.e. normal incidence) decomposes into two polarized components, a p-polarized component and an s-polarized component, and each component undergoes different phase shift, and therefore outgoing light composed of the two polarized components generally becomes elliptically polarized light. If it is expressed by a matrix representation, the electric field vectors can be given by $$\begin{pmatrix} E'_p \\ E'_s \end{pmatrix} = \begin{pmatrix} T_p & 0 \\ 0 & T_s \end{pmatrix} \cdot \begin{pmatrix} E_p \\ E_s \end{pmatrix} = \quad (18)$$
$$\begin{pmatrix} \frac{t_p t'_p e^{-i(kL)}}{1 + r'_p r_p e^{-2i(kL)}} & 0 \\ 0 & \frac{t_s t'_s e^{-i(kL)}}{1 + r'_s r_s e^{-2i(kL)}} \end{pmatrix} \cdot \begin{pmatrix} E_p \\ E_s \end{pmatrix}$$

Figure 5A:
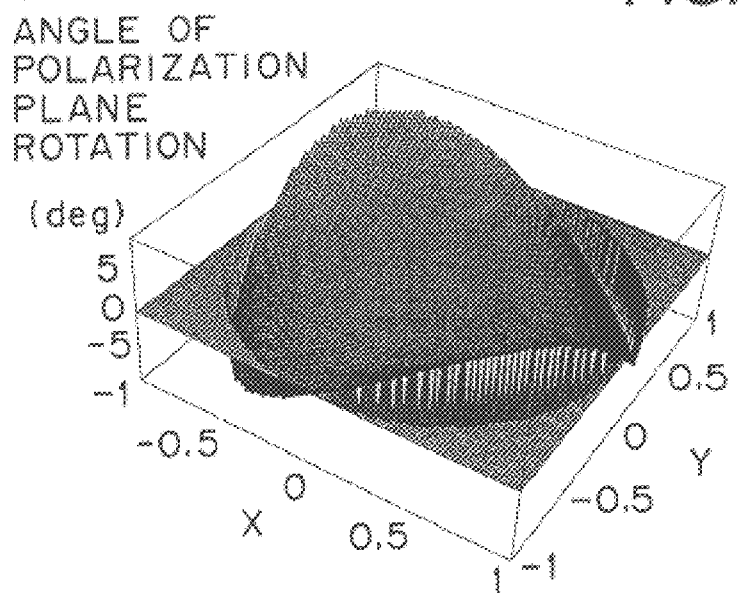
FIG. 5A is a conception diagram showing the angle of polarization plane rotation of Embodiment 1 with an anti-reflection coating.
Figure 5B:
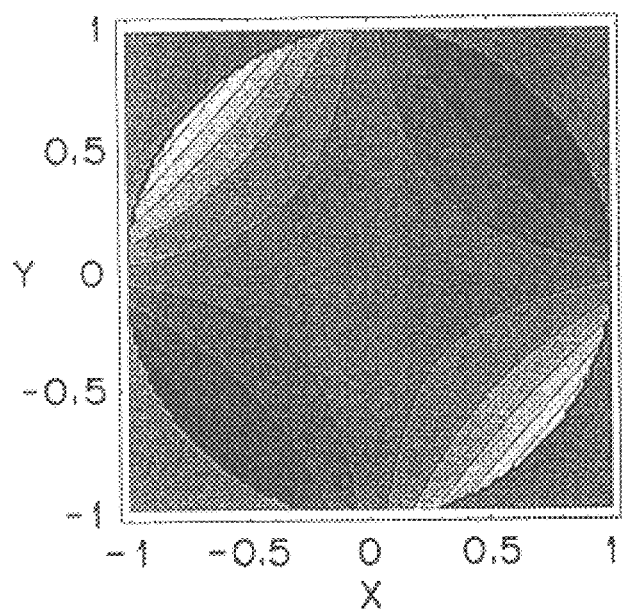
FIG. 5B is a contour map of the diagram of FIG. 5A.
Figure 6A:
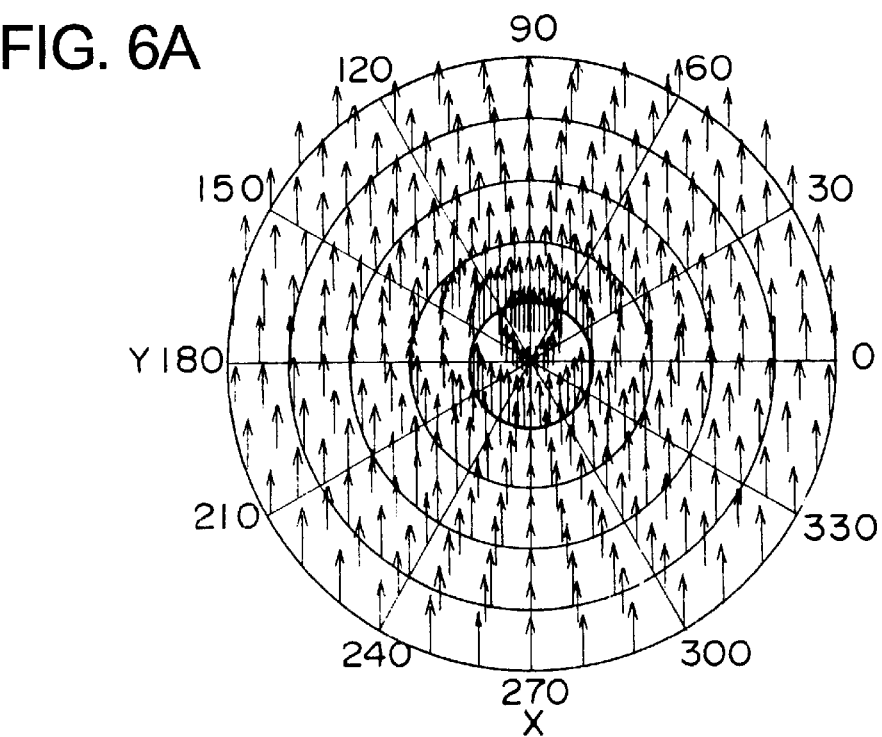
FIG. 6A is a conception diagram showing the directions of orientation in the oriented film which is used for an optical element for correcting the polarization plane rotation of Embodiment 1 with the antireflection coating.
Figure 6B:
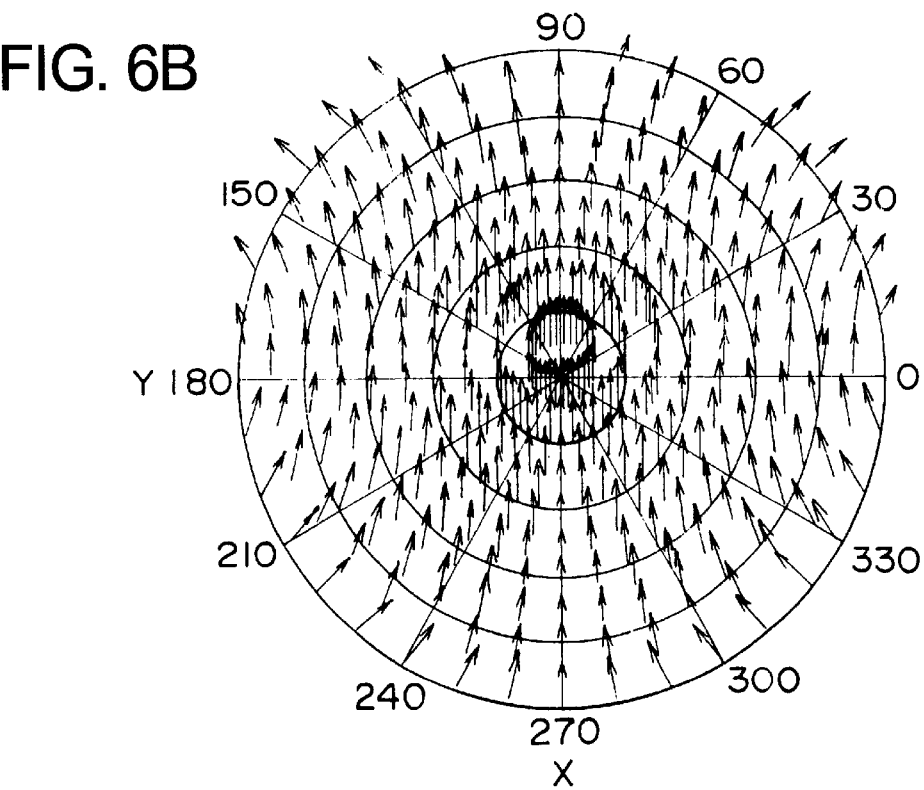
FIG. 6B is a conception diagram similar to FIG. 6A with the azimuthal angle from the y-axis being increased tenfold.

For a generic case of multilayer films, one can find the amplitude transmittance and the amplitude reflectance similarly. This calculation method has been treated in numerous literatures (for example, "Optical Thin Films (second edition)", edited by S. Fujiwara, KYORITSU SHUPPAN, CO., LTD., 1986 and "Optical Thin Films" by H. A. Macleod, NIKKAN KOGYO SHINBUN, LTD., 1989 (Japanese Translation), and also plenty of thin film design software are commercially available. Regarding the aforesaid example, more specifically for a case that a quarter-wavelength $MgF_2$ single layer is coated on an optical element, the angle of polarization plane rotation of the outgoing light to the incident light for each point on the pupil was calculated using the aforesaid formula and the results are shown in FIG. 5. Like the aforesaid case with no antireflection film, the direction of orientation in the oriented film which is appropriate to correct the polarization plane rotation can be calculated from the results. FIG. 6 shows the calculated result. Here, since the ellipticity of the polarized light is sufficiently small, if the direction of the major axis of the polarized light is corrected, enough correction effect to obtain reproduced signals from a magneto-optical disk can be achieved.

In the case of a magneto-optical disk, a thin film structure like this bears a particularly important part in performance. In the magneto-optical disk, rotation angle of Kerr effect is read to detect the signal, and therefore this effect must be considered in addition to that of the multi-layer film. A variety of designs have already been devised and added to this film structure, such as amplification of the angle of Kerr effect by employing a particular structure of the multilayered film for the disk etc., and therefore correction in accordance with a specific design is necessary. However, the transmittance of such structure can be expressed with a complex matrix of 2 rows by 2 columns and hence can be calculated in the same way as in the example described above.

Next, a case of a solid immersion lens (SIL) will be described. In the solid immersion lens, attenuation of total reflection occurs on a last plane of a lens due to coupling between an evanescent field generated by total reflection and an object in close proximity of the last plane. Through analysis of this attenuation, information concerning structure of an object under observation which is equal to the wavelength or less can be obtained. Therefore, the analysis and control of phase caused by this attenuation become important.

First, the amplitude reflectance for a case of total reflection wherein an object to be observed is equal to the wavelength of the light or less will be described. Also in total reflection, it is known that a phase jump between incident light and outgoing light (i.e. reflected light) occurs. For total refection, the absolute value of the amplitude reflectance is unity for both p-polarization and s-polarization. However, the phase jump for p-polarization and that for s-polarization are different to each other, and hence the polarization state of a reflected light is elliptically polarized light. The phase jump can be obtained as follows. Denoting the refractive index of the incident side medium by $n_1$, the refractive index of the exit side medium by $n_2$, the relative index of refraction by $n_{12}$ ($n_{12}=n_2/n_1<1$), the angle of incidence $\theta_i$ and the angle of refraction $\theta_r$ are given by:

$$\sin\theta_t = \frac{\sin\theta_i}{n_{12}} \quad (19)$$

Here, in the case of total reflection, the angel of reflection $\theta_r$, becomes a complex number. Form Equation 19, the following formula:

$$\cos\theta_t = \pm i\sqrt{\frac{\sin^2\theta_i}{n^2} - 1} \qquad (20)$$

is obtained.

The electric field of the transmitted light is given by:

$$E^t = \begin{pmatrix} E_x \\ E_y \\ E_z \end{pmatrix} = \begin{pmatrix} -T_p\cos\theta_1 e^{-i\tau} \\ T_s e^{-i\tau} \\ T_p\sin\theta_1 e^{-i\tau} \end{pmatrix} \qquad (21)$$

Here, its phase is given by:

$$\tau = \omega\left(t - \frac{x\sin\theta_t + z\cos\theta_t}{v_2}\right) \qquad (22)$$

Multiplying Equation 22 by (–i), applying an exponential function on the both statements thereof, and substituting Equation 19 and 20 for sin $\theta_t$ and cos $\theta_t$, respectively $$e^{-i\tau} = e^{-i\omega\left(1-\frac{x\sin\theta_i}{nv_2}\right)} e^{\mp\frac{\omega z}{v_2}\sqrt{\frac{\sin^2\theta_i}{n^2}-1}} \qquad (23)$$

is obtained. Equation 23 with a second term having a positive exponent diverges, and hence has no physical meaning. In case the term has a negative exponent, the amplitude of Equation 23 decays exponentially. This corresponds to an evanescent wave. Therefore, the amplitude reflectance for p-polarization and that for s-polarization are given by:

$$\frac{R_p}{A_p} = \frac{\sin\theta_i\cos\theta_i - \sin\theta_t\cos\theta t}{\sin\theta_i\cos\theta_i + \sin\theta_t\cos\theta} \qquad (24)$$

$$\frac{R_s}{A_s} = \frac{\sin\theta_i\cos\theta_t - \sin\theta_t\cos\theta_i}{\sin\theta_i\cos\theta_t + \sin\theta_t\cos\theta_i}$$

The phase jump of the evanescent wave for p-polarization and that for s-polarization $\delta_p$ and $\delta_s$ are given by:

$$\tan\frac{\delta_p}{2_i} = -\frac{\sqrt{\sin^2\theta_i - n^2}}{n^2\cos\theta_i} \qquad (25)$$

$$\tan\frac{\delta_s}{2} = -\frac{\sqrt{\sin^2\theta_i - n^2}}{\cos\theta_i}$$

respectively, and relative phase difference between two phase jumps $\delta = \delta_s - \delta_p$ is given by:

$$\tan\frac{\delta}{2} = \frac{\cos\theta_i\sqrt{\sin^2\theta_i - n^2}}{\sin^2\theta_i} \qquad (26)$$

If it is expressed by a matrix representation, $$\begin{pmatrix} E'_p \\ E'_s \end{pmatrix} = \begin{pmatrix} 1 & 0 \\ 0 & e^{i\delta} \end{pmatrix} \cdot \begin{pmatrix} E_p \\ E_s \end{pmatrix} = \begin{pmatrix} 1 & 0 \\ 0 & e^{i\frac{\cos\theta_i\sqrt{\sin^2\theta_i - n^2}}{\sin^2\theta_i}} \end{pmatrix} \cdot \begin{pmatrix} E_p \\ E_s \end{pmatrix} \qquad (27)$$

is obtained.

Figure 7:
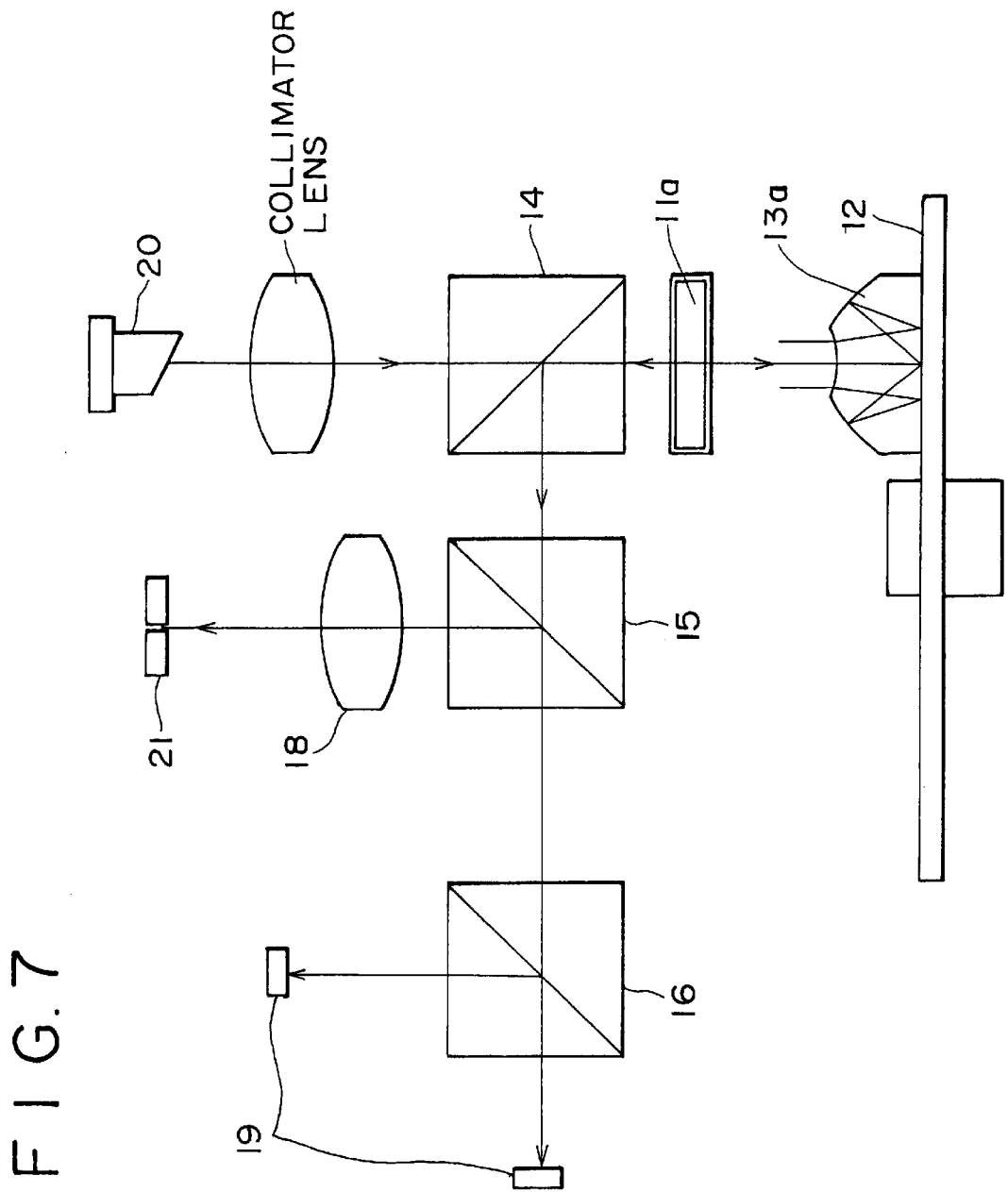
FIG. 7 is a schematic view of an optical system for an information recording and reproducing apparatus of Embodiment 2.

Therefore, if linearly polarized light is allowed to enter the component, a reflected light by total reflection becomes elliptically polarized light. When one intends to use a material having the magneto-optical effect as a recording medium, this large change of the ellipticity of the outgoing light becomes a big problem. As a simplest method to solve the problem, the following method of correction can be considered in a configuration as shown in FIG. 7. Hereupon, numeral 14 denotes a beam splitter, numeral 13a a solid immersion type transformation filter, and numeral 11a a p-polarized light transformation filter disposed between the beam splitter 14 and the solid immersion type transformation filter 13a. The present component transforms incident linearly polarized light completely into p-polarized light or s-polarized light. In this point, if the polarization plane rotation and change of the ellipticity are neglected, reflected light after total reflection is either p-polarized light or s-polarized light without a recording medium . If the reflected light by total reflection is allowed to pass through the component, outgoing light becomes linearly polarized light again. If there exists a recording medium in the optical path, the polarization state after refection is changed. If the change of this polarization state after reflection from that of the initial linearly polarized light is extracted as a signal, the signal recorded in the recording medium can be reproduced.

Figure 8A:
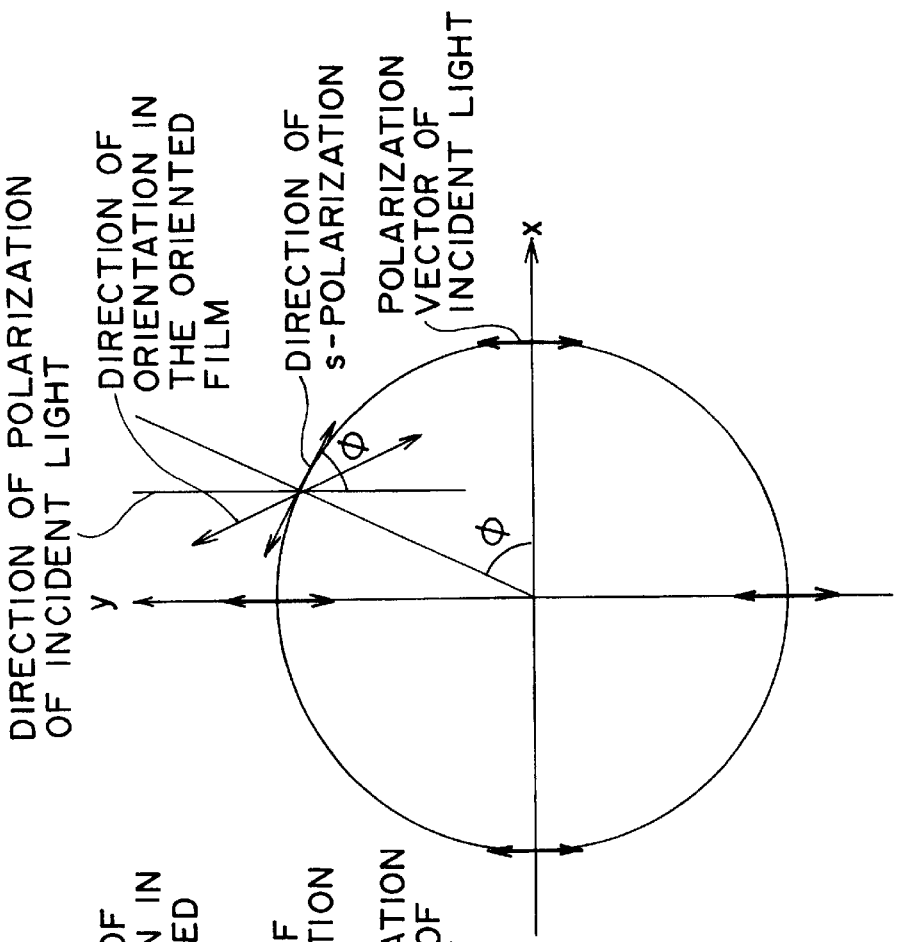
FIG. 8A is an illustration showing the relationship between the direction of polarization of incident light and the direction of orientation in the oriented film for a p-polarized light transformation optical element.
Figure 8B:
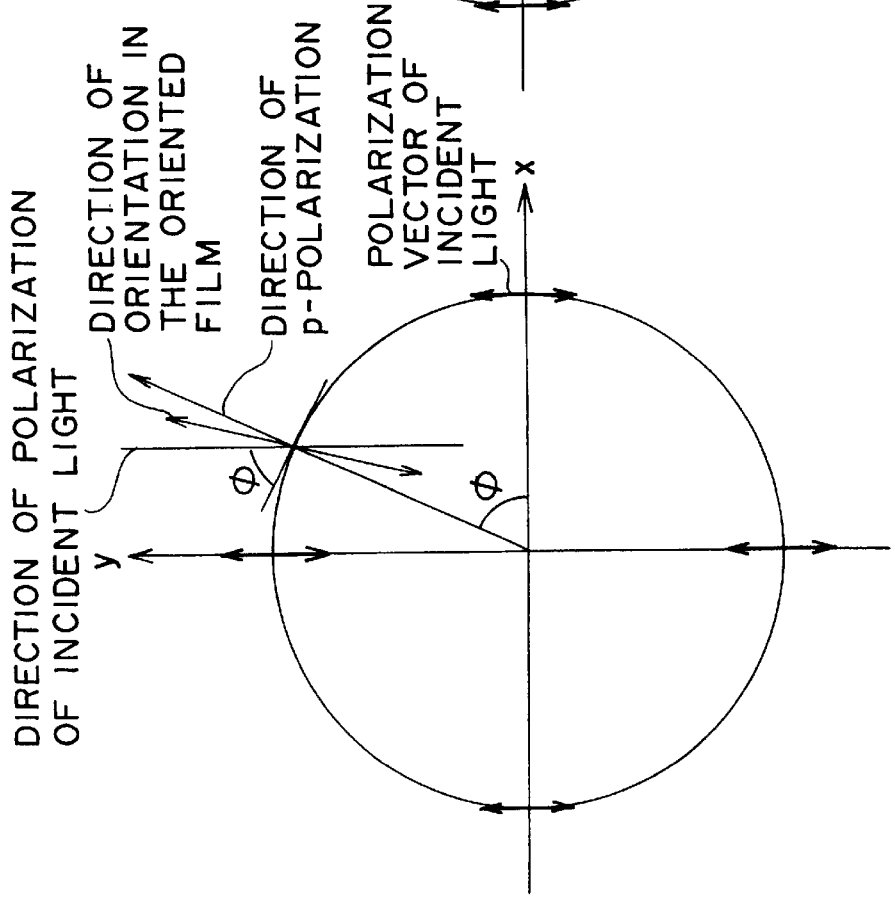
FIG. 8B is an illustration showing the relationship between the direction of polarization of incident light and the direction of orientation in the oriented film for a s-polarized light transformation optical element.
Figure 9A:
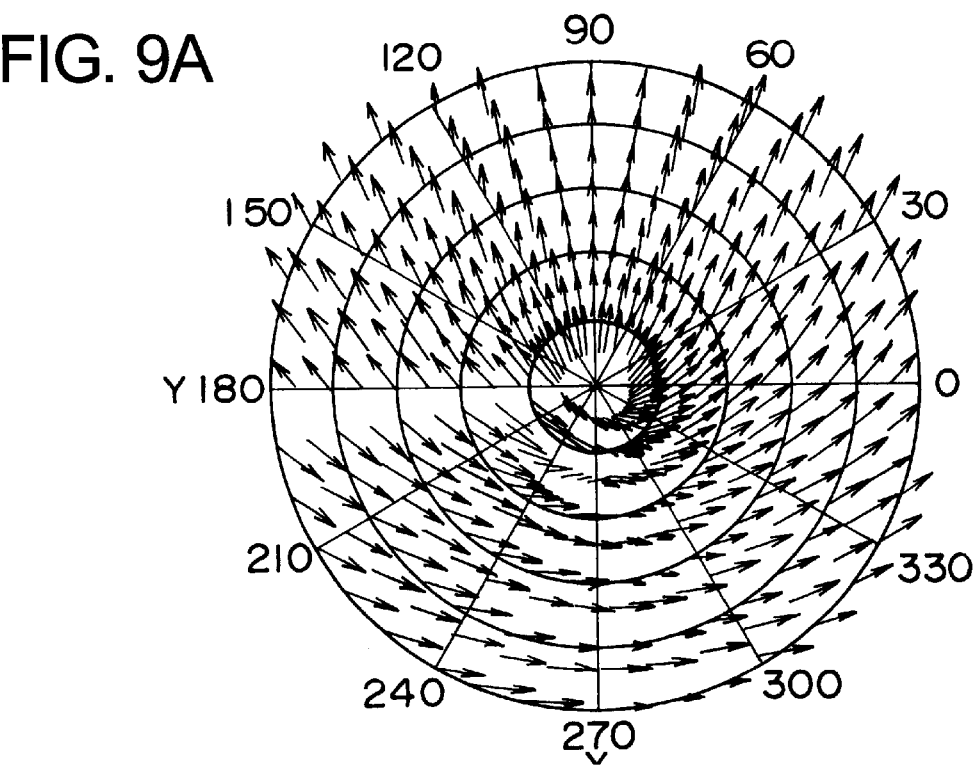
FIG. 9A is a conception diagram showing the directions of orientation in the oriented film which is used for a p-polarized light transformation optical element.
Figure 9B:
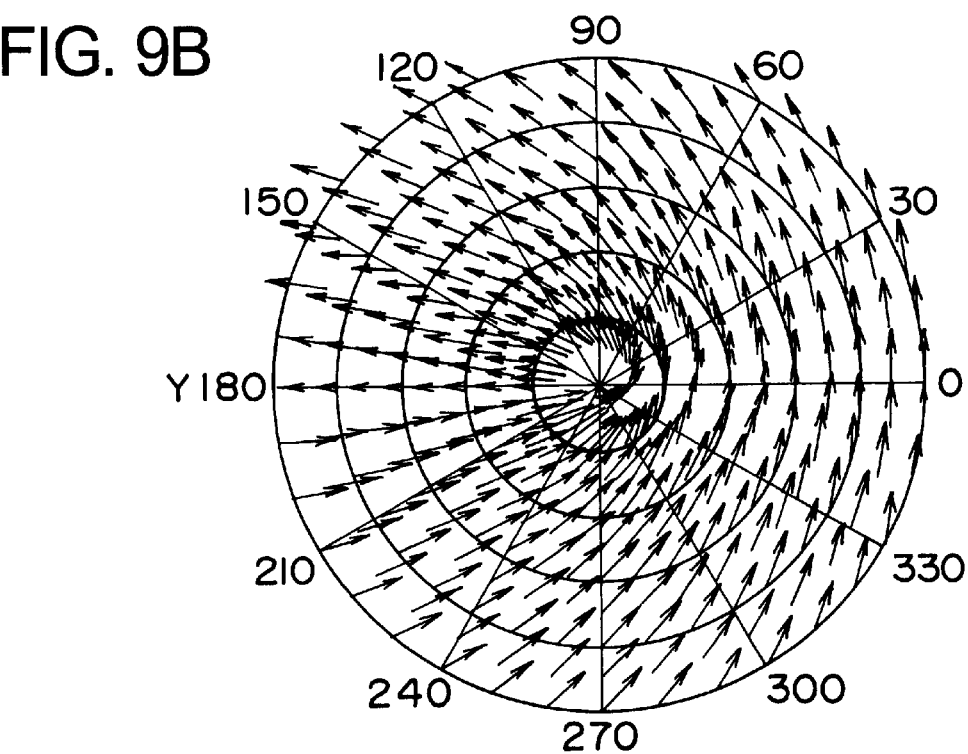
FIG. 9B is a conception diagram showing the directions of orientation in the oriented film which is used for a s-polarized light transformation optical element.
Figure 10:
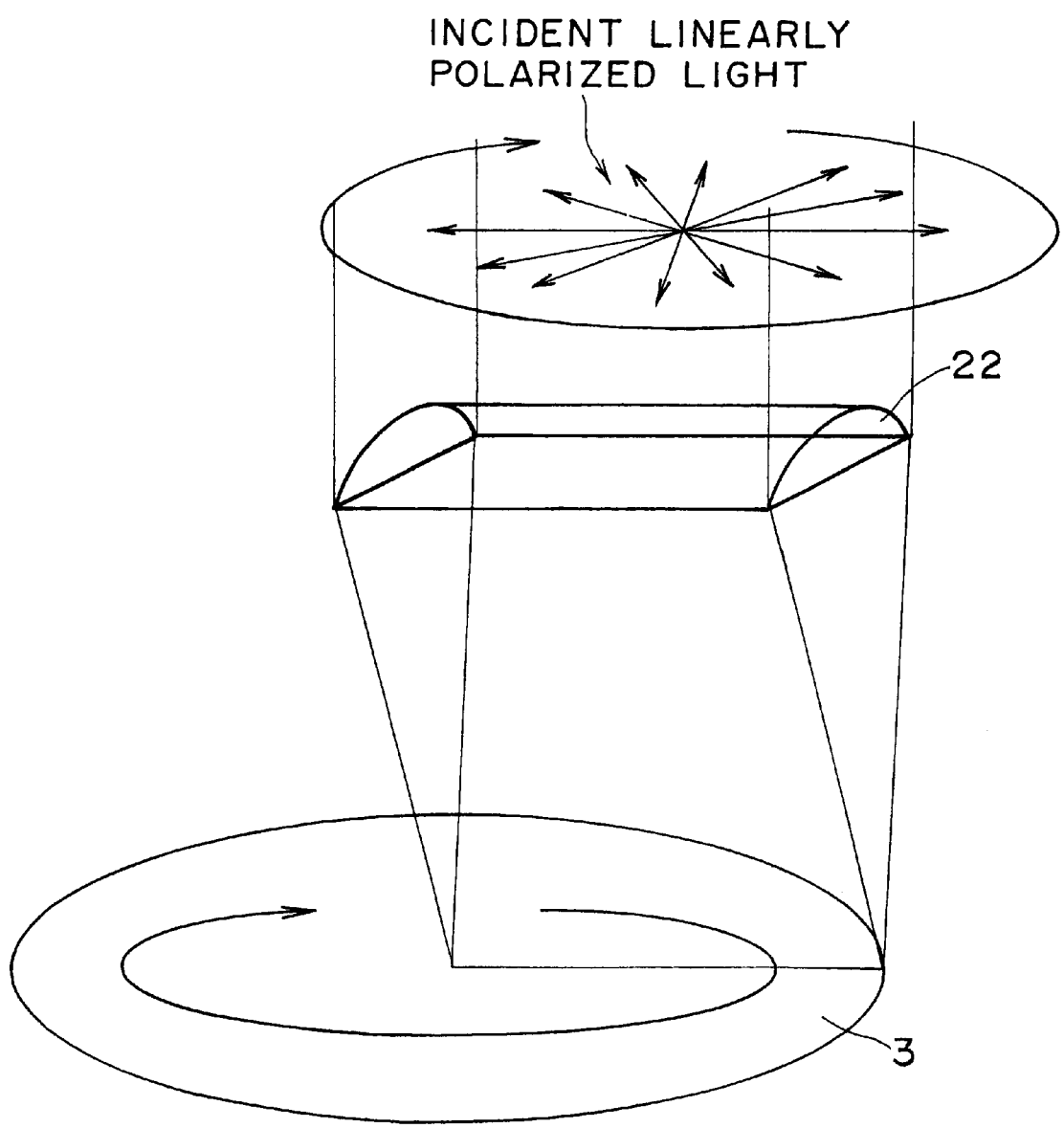
FIG. 10 is an illustration showing a fabrication process of the oriented film for a p-polarized light or s-polarized light transformation optical element.
Figure 11:
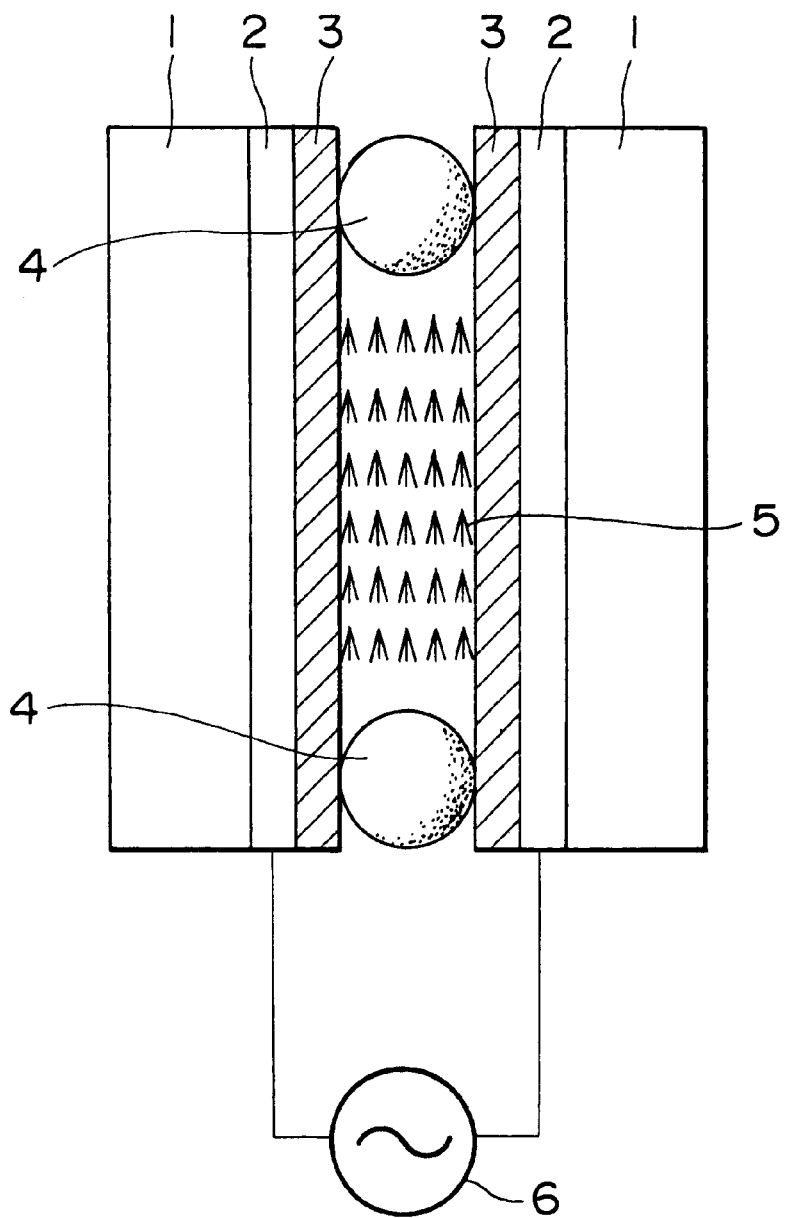
FIG. 11 is a conception diagram showing the liquid crystal with no external electric field applied.
Figure 12:
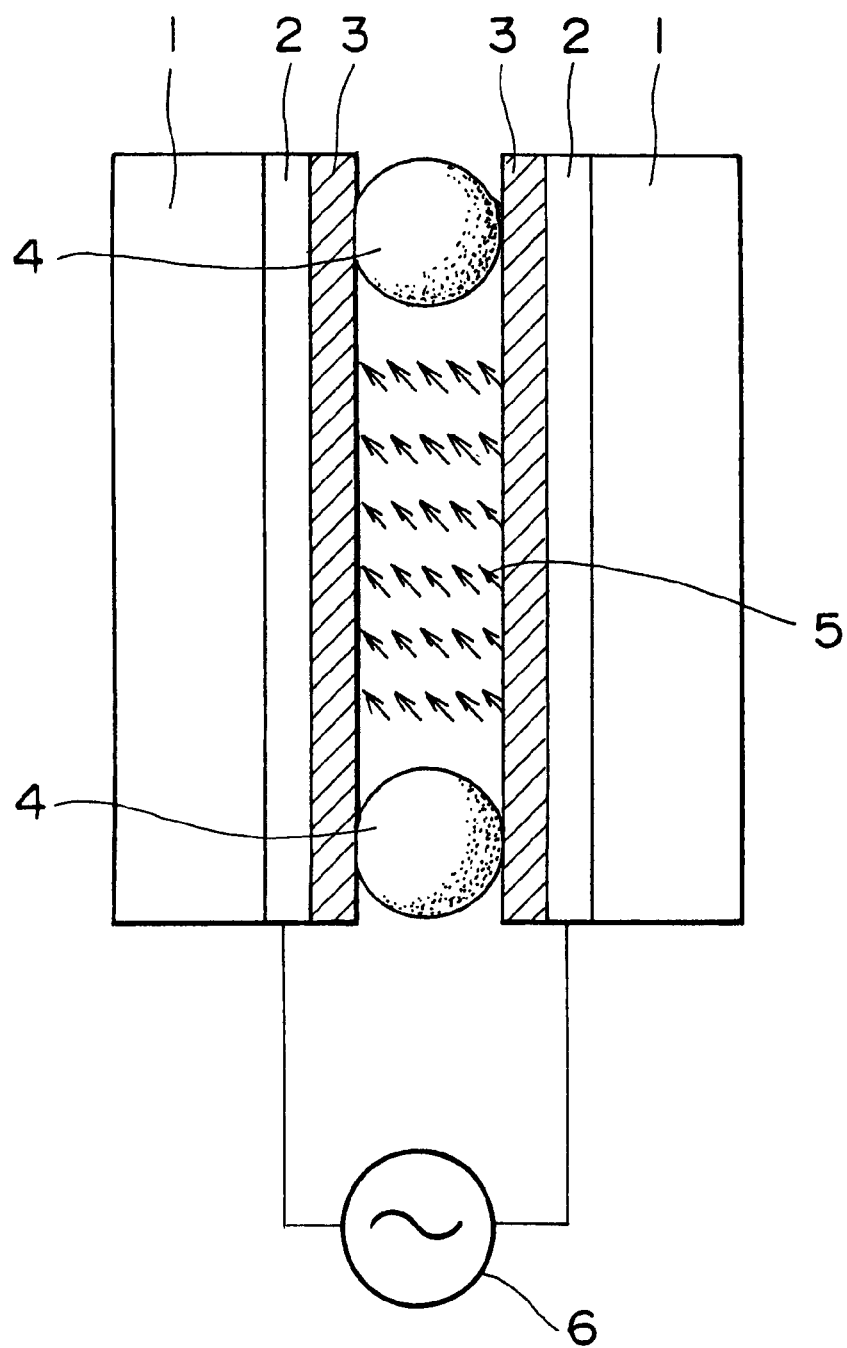
FIG. 12 is a conception diagram showing the liquid crystal with an external electric field applied.
Figure 13:
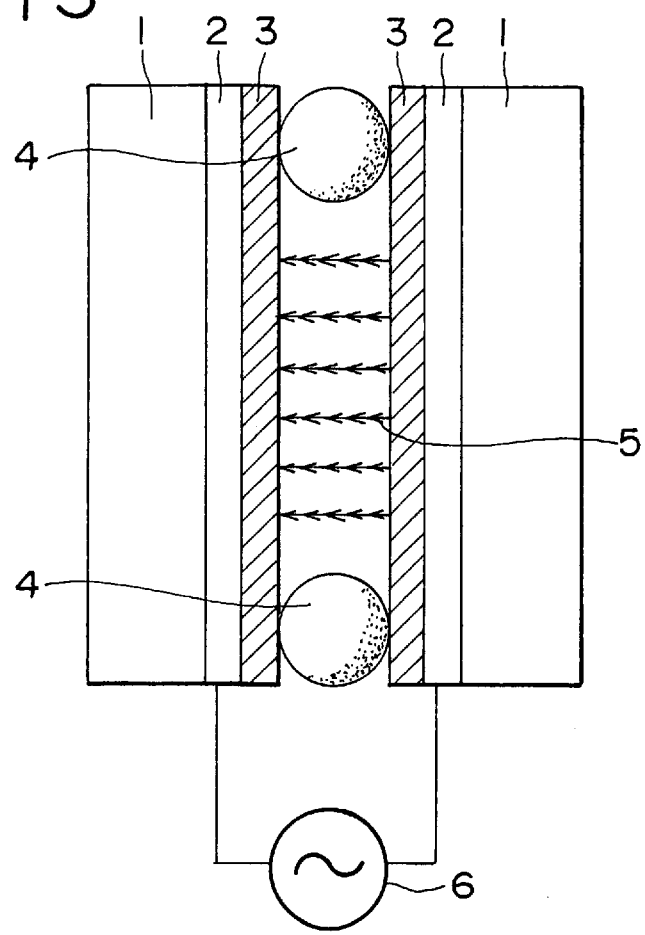
FIG. 13 is a conception diagram showing the liquid crystal with an external electric field applied so as to orient the liquid crystal molecules parallel to a direction of the electric field.
Figure 14:
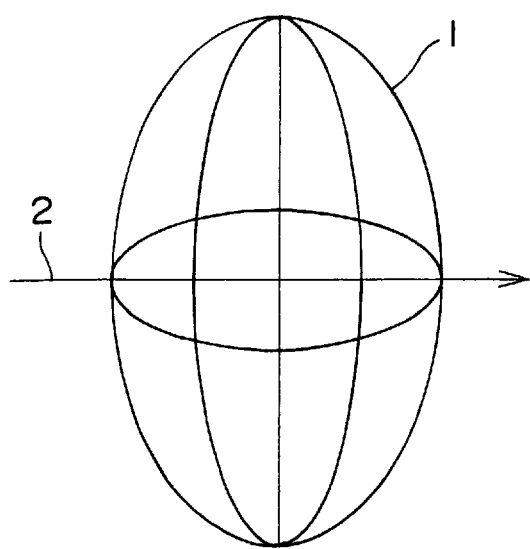
FIG. 14 is a conception diagram of the index ellipsoid with no external electric field applied.

A polarizing filter for extracting the change can be devised as follows. Suppose that incident linearly polarized light is y-direction polarized light (expressed as (0,1) by Jones vector). Here, if the direction of orientation in the oriented film at a position (r,φ) represented in a polar coordinate is set in a direction of a vector (sin((90–φ)/2), cos((90–φ)/2)), (–sin(φ/2), cos(φ/2)) which is represented in a rectangular coordinates and a voltage generating an amount of phase delay of π is applied to a liquid cell, outgoing light transmitted through the polarizing filter is transformed to p-polarized light and s-polarized light, respectively. FIG. 8 illustrates this position relationship and FIG. 9 shows directions of orientation of the component. To fabricate this element, it is necessary only to focus exposure light in a line by using a slit and/or a cylindrical lens onto the oriented film to be exposed by means of the aforesaid method and perform exposure while the direction of polarization of the exposure light is being rotated and at the same time the oriented film is being rotated (FIG. 10). By the way, numeral 3 denotes the oriented film and numeral 22 a cylindrical lens in FIG. 10.

Furthermore, when light passes through a birefringence material or a medium where residual birefringence occurs due to stress etc., the polarization state of the transmitted light is changed. Also regarding this phenomenon, the treatment using Jones vector is known. (For example, "Optical Waves in Crystal", P. Wiley International). Still more, in diffraction type optical elements using diffraction gratings and holograms, since the diffraction efficiency differs for p-polarization and for s-polarization, the polarization state of a transmitted light is changed. To find this exactly, best thing for this is for one to perform calculation based on a rigorous coupled wave theory. If an optical system comprises of a plurality of planes having such characteristic, all things needed to generate arbitrary distribution of polarization states is that one shall perform ray tracing, calculate the reflectance or the transmittance for both p-polarization and s-polarization, represent each plane by a complex matrix of 2 rows by 2 columns as is the case of aforesaid examples, obtain the polarization state of outgoing light, and then find θ and Γ which are to be used to transform the polarization state to a desired polarization state. Since the present optical element is capable of generating arbitrary distribution of polarization states, the present optical element can perform correction for an arbitrary optical element including the cases described above and generate desired arbitrary distribution of polarization states.

As is clearly understood in the foregoing description, the optical element according to the present invention comprises an liquid crystal element wherein a liquid crystal is provided in contact with an oriented film, wherein orientation of the aforesaid oriented film is controlled by light irradiation so that the direction of orientation is set in a predetermined direction discretely or continuously and hence the direction of orientation of liquid crystal molecules provided on the oriented film is spatially changed, and thereby the present invention can devise a small-size, inexpensive, and high-quality polarization transforming optical element, with which the distribution of polarization states can be controlled freely in an active or passive manner.

If the optical element according to the present invention is put to practical use, the followings are possible. That is, one can fabricate a hologram that can be electrically modulated; in an apparatus for detecting the polarization state, such as polarizing microscopes, magneto-optical disk apparatuses, etc., one can correct the polarization plane rotation that causes noise; and in an optical disk application, one can devise a high numerical aperture lens with a high S/N ratio.

Moreover, since the conventional rectifiers need a plurality of lenses, and therefore when one intends to integrate such a rectifier in an optical disk, there arises a problem that the optical disk apparatus becomes complicated and costly. However, if the aforesaid optical element is employed, miniaturization, weight saving, and cost reduction of the polarization compensating optical system can be aimed at. Furthermore, if the optical element is used in polarizing microscopes, design freedom can be expanded and the cost can be decreased compared to conventional rectifiers.

The invention may be embodied in other specific forms without departing from the spirit or essential characteristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical apparatus comprising:
   an objective lens having a numerical aperture of 0.7 or more; and
   a liquid crystal element composed of:
      a liquid crystal,
      an oriented film which is disposed in contact with said liquid crystal and has a distribution of directions of orientation for orienting liquid crystal molecules of said liquid crystal, and
      electric field applying means for applying an electric current field to said liquid crystal to change the direction of orientation of said liquid crystal molecules, the liquid crystal element being used to control or correct a polarization direction of a light after passing through said objective lens so as to be a polarization direction of the light before passing through said objective lens;
   wherein said objective lens and said liquid crystal element are aligned on the optical axis.

2. An optical apparatus according to claim 1, wherein the direction of orientation of said liquid crystal molecules varies discretely or continuously.

3. An optical element according to claim 1, wherein the birefringence of said liquid crystal element is controlled by applying an external voltage to said liquid crystal element.

4. An optical apparatus according to claim 1, which is to be used as a diffraction grating or a hologram having polarization dependency.

5. An optical apparatus according to claim 1, wherein said liquid crystal element is used as a polarization transformation filter that transforms a polarization direction of incident light thereof into a predetermined polarization direction and emits outgoing light of said predetermined polarization direction.

6. An optical apparatus according to claim 1, wherein said liquid element is used as a rectifier and said optical apparatus is composed to be such a polarizing microscope as is intended to transform a polarization direction of incident light thereof into a predetermined polarization direction and emits outgoing light of said predetermined polarization direction.

7. An optical apparatus according to claim 1, wherein said optical apparatus is composed to be an optical information recording and/or reproducing apparatus.

8. A method for manufacturing an optical apparatus comprising:
   an objective lens having a numerical aperture of 0.7 or more; and
   a liquid crystal element composed of
      a liquid crystal,
      an orientation film which is disposed in contact with said liquid crystal and has the direction of orientation for orienting liquid crystal molecules of said liquid crystal, and
      electric field applying means for applying an electric field to said liquid crystal to change the direction of orientation of the liquid crystal molecules, the liquid crystal element being used to control or correct a polarization direction of a light after passing through said objective lens so as to be a polarization direction of the light before passing through said objective lens;
   wherein said objective lens and said liquid crystal element are aligned on the optical axis;
   which includes a step of forming said oriented film having a distribution of directions of orientation in a predetermined direction for orienting said liquid crystal molecules by irradiating said orienting film with the light beam while its polarization state is being varied in fabricating said optical apparatus.

9. A method for manufacturing an optical apparatus according to claim 8, including a step selected from a group consisting of: a step of performing light irradiation on said oriented film while the polarization state of the light beam is being varied by the use of masks, and a step of performing light irradiation on said oriented film while said oriented film is being moved relative to light irradiating means.

10. A method for manufacturing an optical apparatus according to claim 8, including a step wherein the direction of orientation of said liquid crystal molecules is varied discretely or continuously.

* * * * *